(12) United States Patent
Whalley et al.

(10) Patent No.: US 11,784,943 B2
(45) Date of Patent: *Oct. 10, 2023

(54) SHARING ACCOUNT DATA BETWEEN DIFFERENT INTERFACES TO A SERVICE

(71) Applicant: Apple Inc., Cupertino, CA (US)

(72) Inventors: Andrew R. Whalley, San Francisco, CA (US); Bob Bradley, San Jose, CA (US); Kenneth C. McLeod, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,016

(22) Filed: May 30, 2022

(65) Prior Publication Data

US 2022/0294746 A1 Sep. 15, 2022

Related U.S. Application Data

(62) Division of application No. 16/430,295, filed on Jun. 3, 2019, now Pat. No. 11,349,776, which is a division of application No. 14/289,619, filed on May 28, 2014, now Pat. No. 10,313,264.

(51) Int. Cl.
| | |
|---|---|
| *G06F 15/16* | (2006.01) |
| *H04L 47/80* | (2022.01) |
| *H04L 67/02* | (2022.01) |
| *H04W 4/00* | (2018.01) |
| *H04W 12/086* | (2021.01) |
| *H04L 67/53* | (2022.01) |
| *H04W 12/08* | (2021.01) |
| *H04W 12/12* | (2021.01) |

(52) U.S. Cl.
CPC ............ *H04L 47/803* (2013.01); *H04L 67/02* (2013.01); *H04L 67/53* (2022.05); *H04W 4/00* (2013.01); *H04W 12/08* (2013.01); *H04W 12/086* (2021.01); *H04W 12/12* (2013.01)

(58) Field of Classification Search
CPC ....... H04L 47/803; H04L 67/02; H04L 67/20; H04W 12/12; H04W 4/00
See application file for complete search history.

(56) References Cited

U.S. PATENT DOCUMENTS

| | | |
|---|---|---|
| 6,438,600 B1 | 8/2002 | Greenfield |
| 6,829,655 B1 | 12/2004 | Huang |
| 7,673,327 B1 | 3/2010 | Polis |
| 7,689,875 B2 | 3/2010 | Cahil |
| 8,589,541 B2 | 11/2013 | Raleigh |

(Continued)

FOREIGN PATENT DOCUMENTS

EP 3047628 A1 * 7/2016 ............. G06F 21/41

*Primary Examiner* — Ario Etienne
*Assistant Examiner* — Thorne E Waugh
(74) *Attorney, Agent, or Firm* — BAKERHOSTETLER

(57) ABSTRACT

Some embodiments provide a method for an electronic device. The method stores user data associated with a web-based third party service based on user interaction with a web domain for the third party service through a web browser. The method receives a request from a service-specific application to utilize the user data stored for the third party service. The method provides the user data to the application only when the application is verified by the web domain for receiving user data associated with the third party service.

20 Claims, 15 Drawing Sheets

(56) References Cited

U.S. PATENT DOCUMENTS

| | | |
|---|---|---|
| 8,589,795 B2 | 11/2013 | Feng |
| 8,990,911 B2 | 3/2015 | Olden |
| 9,001,370 B1 | 4/2015 | Nuggehalli |
| 9,055,063 B2 | 6/2015 | Dwan |
| 9,064,105 B2 | 6/2015 | Hosoda |
| 9,122,858 B2 | 9/2015 | Dittrich |
| 9,130,922 B2 | 9/2015 | Fushman |
| 9,147,201 B2 | 9/2015 | Crawford |
| 9,179,316 B2 * | 11/2015 | Raleigh ............... H04W 12/00 |
| 9,197,513 B2 | 11/2015 | Vasudev |
| 9,203,874 B2 | 12/2015 | Kadishay |
| 9,210,164 B2 | 12/2015 | Krift |
| 9,222,963 B2 | 12/2015 | Houston |
| 9,225,718 B2 * | 12/2015 | Jain ..................... G06Q 40/00 |
| 9,338,007 B1 | 5/2016 | Doshi |
| 9,344,431 B2 | 5/2016 | Mahaffey |
| 9,461,982 B2 * | 10/2016 | Rajagopal ............. H04L 63/08 |
| 9,479,511 B2 | 10/2016 | Dittrich |
| 9,552,615 B2 | 1/2017 | Mathura |
| 9,753,796 B2 | 9/2017 | Mahaffey |
| 9,838,145 B2 * | 12/2017 | Tawfiq Moshtaha ........................ H04W 12/068 |
| 9,866,382 B2 | 1/2018 | Wagner |
| 9,922,354 B2 | 3/2018 | Howard |
| 10,055,609 B2 | 8/2018 | Brands |
| 10,235,439 B2 | 3/2019 | Sullivan |
| 10,313,264 B2 | 6/2019 | Whalley |
| 10,942,726 B2 * | 3/2021 | Oliver ................. H04L 67/306 |
| 11,132,116 B2 * | 9/2021 | Rathod ................. G06F 3/0481 |
| 11,368,327 B2 * | 6/2022 | Kitchen .............. H04L 12/2818 |
| 2002/0087892 A1 * | 7/2002 | Imazu ................. H04L 63/083 726/6 |
| 2002/0184095 A1 | 12/2002 | Scullard |
| 2004/0111644 A1 | 6/2004 | Saunders |
| 2004/0133640 A1 | 7/2004 | Yeager et al. |
| 2005/0114591 A1 | 5/2005 | Coronado et al. |
| 2006/0149970 A1 | 7/2006 | Imazu |
| 2008/0022379 A1 | 1/2008 | Wray |
| 2008/0046983 A1 | 2/2008 | Lester |
| 2009/0064303 A1 | 3/2009 | Dockinson |
| 2009/0144237 A1 | 6/2009 | Branam |
| 2009/0247193 A1 | 10/2009 | Kalavade |
| 2009/0307072 A1 | 12/2009 | Morales-Lema |
| 2010/0107229 A1 | 4/2010 | Najafi |
| 2010/0146611 A1 | 6/2010 | Kuzin |
| 2010/0161487 A1 | 6/2010 | Patel |
| 2010/0257224 A1 | 10/2010 | Tobita |
| 2011/0251992 A1 * | 10/2011 | Bethlehem ............ H04L 67/141 707/610 |
| 2012/0079095 A1 | 3/2012 | Evans |
| 2012/0204248 A1 | 8/2012 | Gonzalez |
| 2013/0061140 A1 | 3/2013 | Nseir |
| 2013/0086670 A1 | 4/2013 | Vangpat |
| 2013/0198510 A1 | 8/2013 | Rahman |
| 2013/0208893 A1 | 8/2013 | Shablygin |
| 2013/0212432 A1 | 8/2013 | Guthrie |
| 2014/0033291 A1 | 1/2014 | Liu |
| 2014/0053227 A1 | 2/2014 | Ruppin et al. |
| 2014/0068593 A1 | 3/2014 | McErlane |
| 2014/0095894 A1 * | 4/2014 | Barton ................. G06F 21/6218 726/1 |
| 2014/0250511 A1 | 9/2014 | Kendall |
| 2015/0012616 A1 | 1/2015 | Pearl |
| 2015/0288661 A1 | 10/2015 | Monk |
| 2015/0304307 A1 | 10/2015 | Kaur |
| 2017/0078886 A1 | 3/2017 | Raleigh |
| 2017/0199920 A1 | 7/2017 | Pearson |
| 2017/0289135 A1 | 10/2017 | Uchil |
| 2018/0176318 A1 * | 6/2018 | Rathod ................. G06Q 20/10 |
| 2018/0367560 A1 | 12/2018 | Mahaffey |
| 2020/0267207 A1 * | 8/2020 | Kitchen ................. H04L 67/02 |
| 2020/0349513 A1 * | 11/2020 | Farah ................... G06Q 40/12 |
| 2022/0244933 A1 * | 8/2022 | Meredith ............... G06F 3/048 |

* cited by examiner

SHARING ACCOUNT DATA BETWEEN DIFFERENT INTERFACES TO A SERVICE

CROSS-REFERENCE TO RELATED APPLICATIONS

This application is a divisional application of U.S. patent application Ser. No. 16/430,295, entitled "Sharing Account Data Between Different Interfaces to a Service," filed on Jun. 3, 2019, which is a divisional application of U.S. patent application Ser. No. 14/289,619, entitled "Sharing Account Data Between Different Interfaces to a Service," filed on May 28, 2014, which is hereby incorporated by reference in its entirety for all purposes.

BACKGROUND

Many mobile devices (e.g., smart phones, tablets) use native applications, or apps, to access various web-based services. For example, various social media, photo-sharing, streaming video, and other web-based services develop their own applications for mobile device operating systems. FIG. 1 illustrates an example of such a web-based service entity 100, to which both a mobile device 105 and a laptop computer 110 connect through the Internet 115 (while laptops are, of course, mobile, this document uses mobile device to primarily refer to devices such as smart phones and tablets that run on mobile operating systems).

As shown in FIG. 1, in some cases these devices may connect to different servers provided by the web-based service entity 100 (the mobile device 105 connecting through a native application to the mobile app server 120 and the laptop computer connecting through a web browser to the web server 125). The web-based entity stores passwords and other user data for the users of these devices, which is used by both the web server and the mobile app server. However, the user has to login to the entity separately on the mobile device 105 and the laptop 110, as well as for any other devices. In addition, the user may access the web server via a web browser on the mobile device, and would have to log in separately from the application login. This requires the user to remember and enter all of their passwords each time they acquire a new device.

BRIEF SUMMARY

Some embodiments provide a framework to enable one or more devices to share user data related to a third party entity (e.g., a web-based content or service provider). The framework enables different interfaces that access the same third party entity to use the shared data, and pass the shared data between each other. For example, in some embodiments, a web browser that accesses the third party entity via a website and an application provided by the third party entity for accessing the entity share data with each other via a data repository on the device or devices on which they operate.

When a first one of the interfaces wants to use data stored on the device by a second interface, in some embodiments the first interface provides a request to the device (e.g., to the operating system of the device, or to a background application operating on the device) to enable sharing of data between itself and the second interface. The device determines whether the first and second interfaces are verified to share data with each other (e.g., by checking a database of verified trust relationships). If the two interfaces are verified, the device releases the requested account data to the requesting interface.

In some embodiments, in order to determine whether two interfaces may share user data, the device stores a database of verified interface partnerships and types of data. For instance, the database of some embodiments stores a set of application-web domain pairings, for applications that access the same third party as a web browser connecting to the web domain. Each pairing, in some embodiments, further specifies a type of account data that may be shared between the two interfaces (e.g., credentials such as a username, password, username/password combination, tokens such as OAuth tokens, HTTP cookies, etc., task continuation data specifying the user's most recent interactions with a third party entity, or other data associated with a user account or the user's interactions with the third party entity).

As mentioned, in order for two interfaces on a device (or on separate devices) to share user data with each other, some embodiments require that a relationship between the interfaces be verified by one of the devices. For instance, in the case of a web domain and application using the same account data, in some embodiments (i) the application provides data identifying the web domain for data sharing, and (ii) the web domain separately provides data identifying the application for data sharing. Similarly, two web domains or two applications can provide data identifying each other for user data sharing. In some embodiments, the two interfaces also specify the type of user data to be shared (e.g., credentials, task continuation data, etc.).

In some embodiments, the application provides its own application identifier and a set of web domains (e.g., www.xyz.com) and shared account data types (e.g., password). The device then contacts the web server at the specified domain in order to receive a certified list of associated applications for user data sharing and the types of data to be shared (e.g., signed with a certificate issued from a trusted certification authority). When the requesting application is on the list received from the web server, the device stores the verified relationship in a database in order to provide the verified account data to the application.

Similarly, two applications might share data by providing each other's application identifiers to the device for verification, rather than providing a web domain. Two web domains (e.g., www.xyz.com and mobile.xyz.com) could list each other for account data sharing as well.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a framework to enable one or more devices to share user data related to a third party entity (e.g., a web-based content or service provider). The framework enables different interfaces that access the same third party entity to use the shared data, and pass the shared data between each other. For example, in some embodiments, a web browser that accesses the third party entity via a website and an application provided by the third party entity for accessing the entity share data with each other via a data repository on the device or devices on which they operate.

Figure 1:
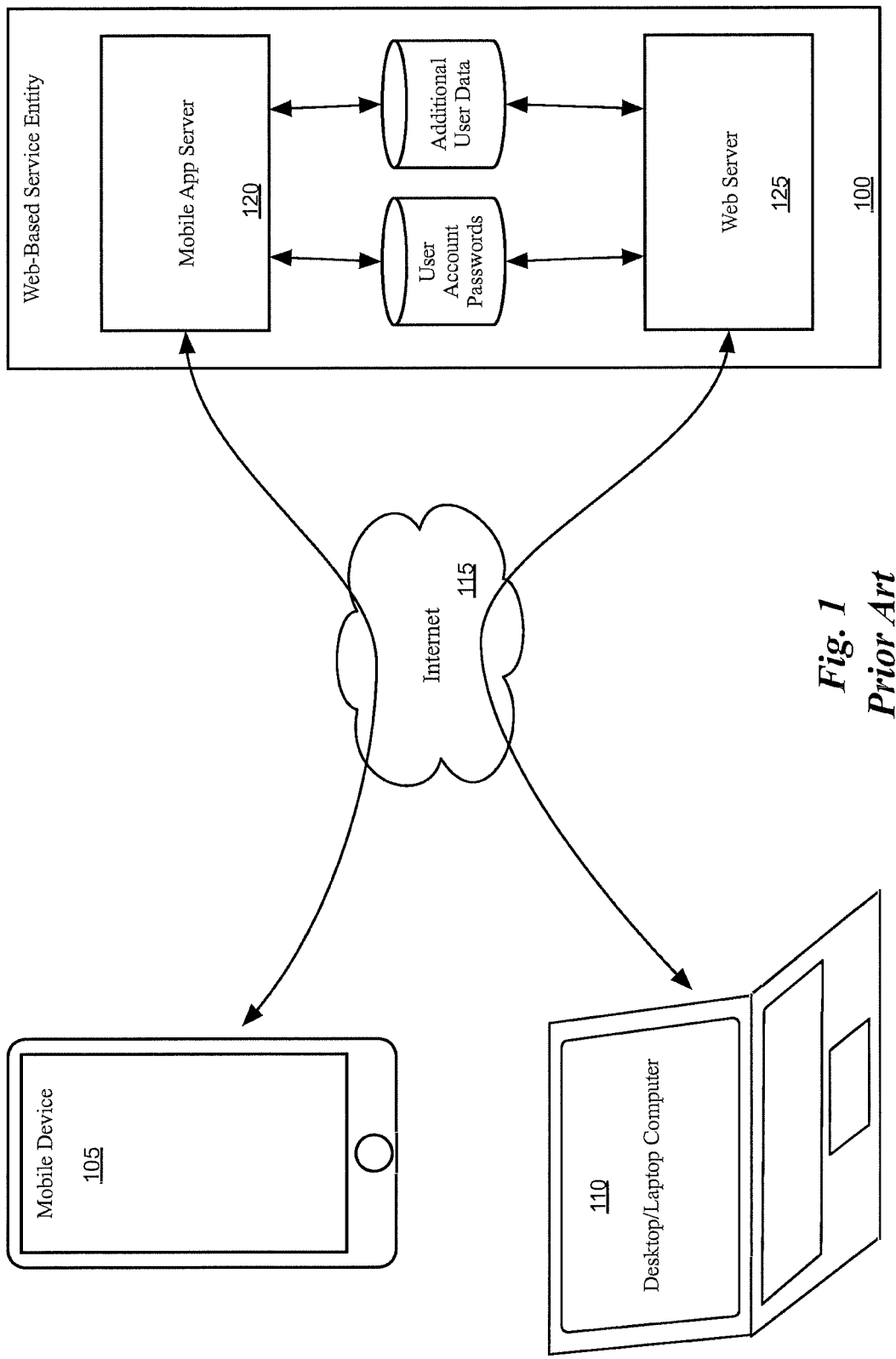
FIG. 1 illustrates an example of a web-based service entity.
Figure 2:
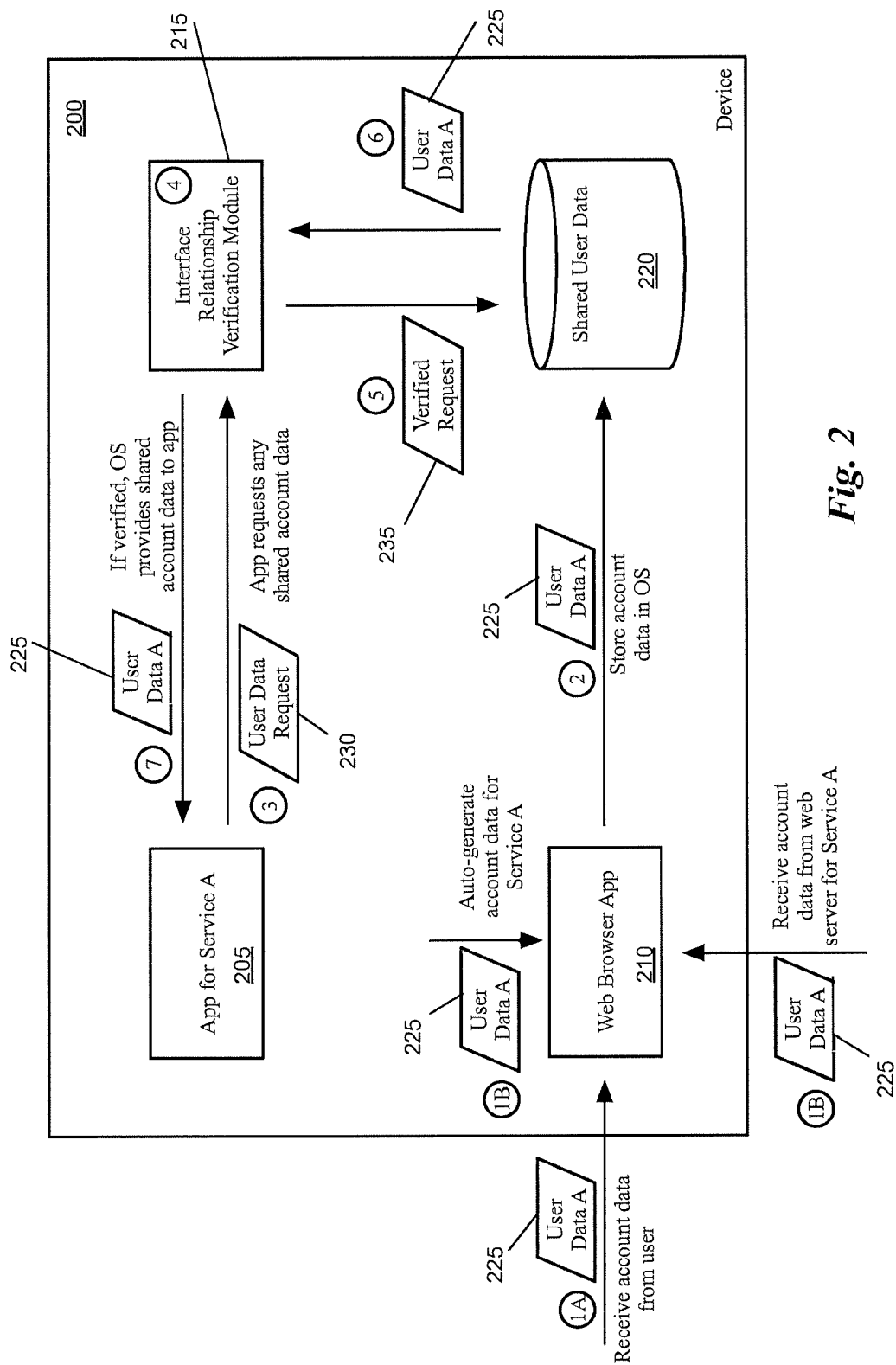
FIG. 2 conceptually illustrates the use of framework within a device to provide shared user data stored on the device to an application.

FIG. 2 conceptually illustrates the use of such a framework within a device 200, to provide shared user data stored on the device to an application 205. The device 200, as shown, includes the application 205 for a particular service available over the Internet, a web browser application 210 (e.g., the Safari® browser provided by Apple®), an interface relationship verification module 215, and web service account data 220. In some embodiments, the device 200 might be a smart phone, table computer, laptop or desktop computer, or other personal electronic device with which a user accesses web services.

The application 205 is an application that operates on top of the operating system of the device 200, and provides an interface to a particular web-based service (Service A). For instance, the device 200 might be an iPhone® or iPad®, and the application 205 is a third-party provided application (e.g., a Facebook® application, Yelp® application, etc.). The web-based service allows users to create a user account, login to the service (e.g., with a username and password, etc.), and to interact with the service.

The web browser application 210 is an application for accessing web domains. The web browser application can provide an interface to many different web-based services, including Service A. Based on the Uniform Resource Locator (URL) input by the user of the device 200 (or otherwise provided to the web browser), the web browser 210 accesses a particular domain and allows users to create a user account, login to the service associated with the particular domain, and interact with the service. In many cases, the application 205 and web browser 210 provide different interfaces to the same web-based service. The web-based service, in most cases, requires the same username and password irrespective of whether the user accesses the service through the generic web browser 210 or the service-specific application 205, although the two interfaces access different domains in some cases. For some services, the functionality provided by the application may vary in some ways from the functionality provided when accessing the service through the web browser.

The shared user data 220, in some embodiments, stores data associated with a user of the device for various web-based services. In many cases, the user of an electronic device will have accounts with numerous web-based services (e.g., social media accounts, streaming video accounts, multi-purpose web entity accounts, etc.), and may also access web-based services without an account (e.g., a news provider website, etc.). For all of these web-based services, the device 200 (if authorized to do so by the user) stores various types of data that may be used in order to access and interact with the various services in a more automated fashion. For instance, the shared user data 220 might store credentials (e.g., usernames and/or passwords) for a service to enable the device to log into the service automatically, or data indicating the particular recent interactions with a web-based service (e.g., the most recent content viewed through the web-based service and a location in that content). In addition, in some cases (as shown below in FIG. 3), the shared user data 220 may be received (or generated) at a different device that synchronizes shared user data with the device 200. This data is referred to in some places in this document as shared account data, although in some cases the data may not necessarily be tied to a specific account with the web-based service, and is only tied to the service generally.

The interface relationship verification module 215 handles the distribution, to a first interface with a service, of shared user data generated by a second interface with the service. In some embodiments, the verification module 215 is a daemon operating in the background of the device 200, or is a part of the device operating system. In some embodiments, the functions of the interface relationship verification module 215 are actually performed by more than one background application. The verification module 215, in some embodiments, performs two primary tasks: (i) building a database of verified trust relationships between interfaces (not shown), and (ii) handling requests from interfaces (e.g., applications such as the application 205) for shared user data 220 generated by other interfaces.

The operation of the device 200 to distribute shared user data, generated through the web browser interface with Service A, to the application 205 for Service A, will now be described by reference to the data flow illustrated in FIG. 2. As shown by the encircled IA, IB, and IC, user data 225 relating to Service A may be generated in several different manners. In some cases, the web browser application receives user data 225 from a user of the mobile device (e.g., the user entering a username and password for a web service). In other cases, the user data 225 is received from the web server for the web service. In yet other instances, the device automatically generates the user data 225. One such example is the auto-generation of passwords for web services. The devices of some embodiments include a password auto-generation function. When a user signs up for a new web service, the device 200 automatically generates a random password for the web service, and stores the data in the shared user data 220. This provides the user with a password that is more difficult to crack by an attacker attempting to access the user's account with the web service, and assures that the user will have a different password for each web service. In addition, the device 200 shares the stored account data with other devices owned by the user, so that the user can access the web services on those other devices as well.

As shown by the encircled 2, the user data 225 relating to Service A is stored in the shared user data 220. In some embodiments, the web browser application 220 itself stores this data, while in other embodiments one or more modules associated with the operating system of the device 200 store the information. For instance, in the case of auto-generated passwords, the same modules that handle the password generation also handle storing this information in the shared user data storage 220. This shared user data may include various types of data, such as credentials (username, password, or username/password combinations), tokens (e.g., OAuth tokens, HTTP cookies, etc.), task continuation data, or other data associated with a web-based service. In some embodiments, the shared user data is stored in an encrypted form on the device 200.

When the application 205 wants to use the shared user data 225 stored on the device, the application sends a request 230 to the interface relationship verification module 215 (as shown by the encircled 3). In some embodiments, this request is sent as an API call to the module 215. For instance, the application may want to login to Service A, and therefore requires the username and password for the account that the user of the device 200 has with Service A.

As shown by the encircled 4, the interface relationship verification module 215 performs a verification operation before releasing the data to the requesting interface (the application 205). In some embodiments, in order to determine whether two interfaces may share user data, the interface relationship verification module 215 stores a database of verified interface partnerships and types of data. For instance, the database of some embodiments stores a set of application-web domain pairings, for applications that access the same third party as a web browser connecting to the web domain. Each pairing, in some embodiments, further specifies a type of account data that may be shared between the two interfaces (e.g., credentials, task continuation data, etc.). In this case, the interface relationship verification module 215 verifies whether the application 205 has been verified to view user data associated with a user's interaction with a particular web domain.

After verifying the request, the verification module 215 requests the user data from the storage 220 (as shown by the verified request 235 with the encircled 5) and receives this data 225 from the shared user data storage 220 (as shown by the encircled 6). The verification module 215 can then provide the application 205 with the user data 225 that the application requested.

In the example shown in FIG. 2, the shared data 225 relating to the user interaction with Service A was generated/received through a first interface at the device 200, then used by a second interface at the device 200. In some embodiments, the shared user data may be generated by a first interface (e.g., a web domain accessed through a web browser) operating on one device and then used by a second interface (e.g., a service-specific application) operating on another device.

Figure 3:
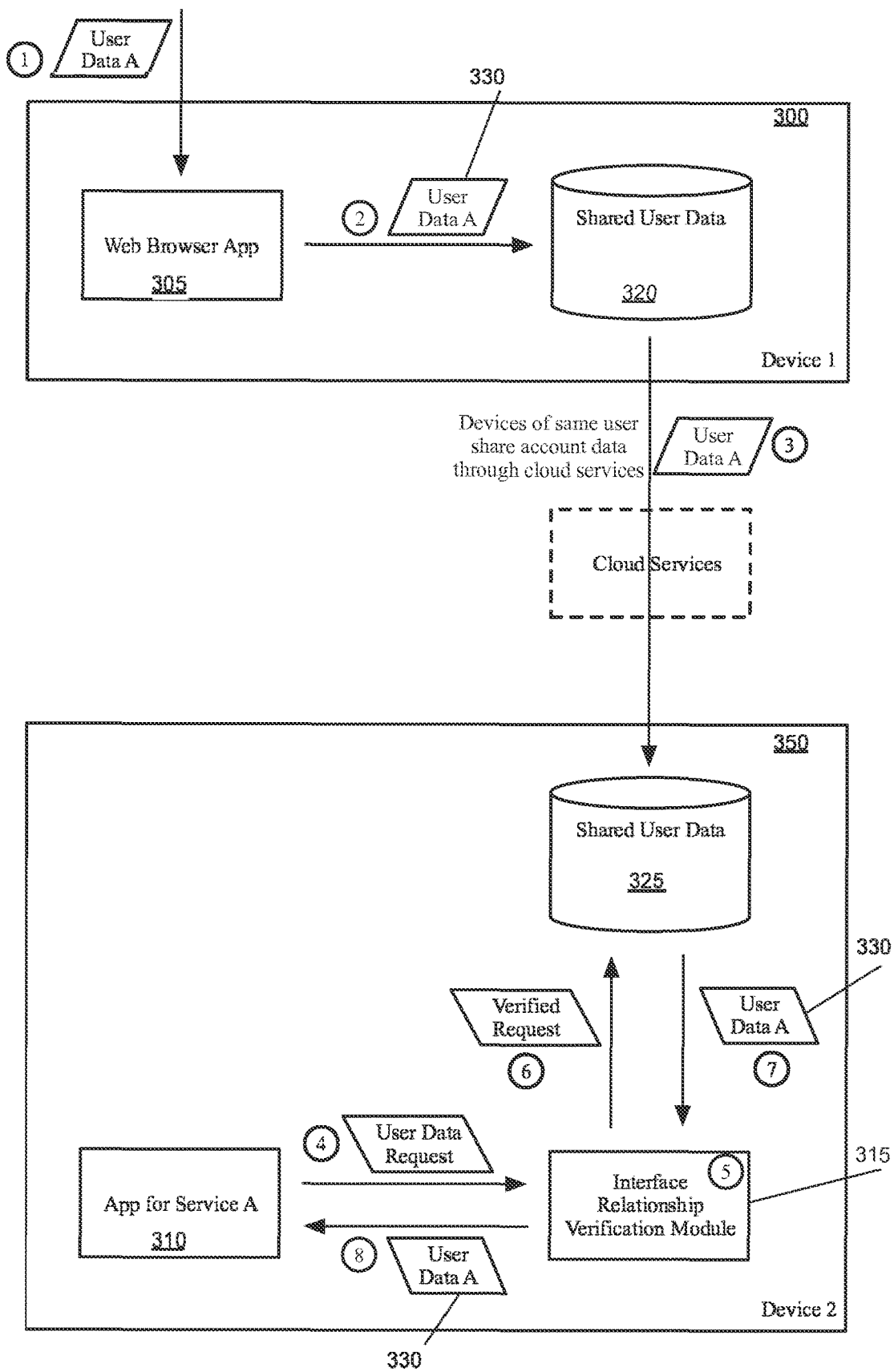
FIG. 3 illustrates such an example of two devices that are configured to share user data with each other.

FIG. 3 illustrates such an example of two devices 300 and 350 that are configured to share user data with each other. In this case, each of the devices 300 and 350 could be a smart phone, tablet, laptop or desktop computer, etc. Both of the devices are owned/operated by the same user, and are therefore configured to share user data with each other. The sharing of user data, especially passwords, between devices is described in greater detail in U.S. application Ser. No. 13/839,050, filed Mar. 15, 2013 and now issued as U.S. Pat. No. 9,197,700, which is incorporated herein by reference.

In this figure, a web browser application 305 operates on the first device 300, and a service-specific application 310 operates on the second device 350, along with an interface relationship verification module 315. Both of the devices 300 and 350 store shared user data 320 and 325, respectively. The operation and data flow shown in FIG. 3 is similar to that of FIG. 2, with the exception of changes introduced by sharing data between devices. As shown by the encircled 1 and 2, the web browser application 305 on the first device 300 receives user data 330 relating to Service A (which may be input by a user, auto-generated by the device, or received from a web server for Service A) and stores this data in the shared user data storage 320.

The first device 300 shares the user data 330 with the second device 350 in a synchronization operation. As described in application Ser. No. 13/839,050, the two devices (and potentially other devices) synchronize shared user data (e.g., credentials and other data) with each other, once verified. In different embodiments, the devices either directly share the information with each other in a peer-to-peer connection, or share the data via an account that the user of the devices has with a cloud service 335 (e.g., an iCloud® account).

Once the device 350 stores the user data 330 in its shared user data storage 325, the operation to share this data with the application 310 proceeds as described above for FIG. 2. The application 310 requests the data, and the interface relationship verification module 315 verifies that the application has a verified trust relationship with the web domain for which the shared data 330 was generated. The verification module 315 retrieves the shared data 330 from the shared user data storage 325, and provides that data to the application 310.

As mentioned, in order for two interfaces on a device (or on separate devices) to share user data with each other, some embodiments require that a relationship between the interfaces be verified by one of the devices. For instance, in the case of a web domain and application using the same account data, in some embodiments (i) the application provides data identifying the web domain for data sharing, and (ii) the web domain separately provides data identifying the application for data sharing. Similarly, two web domains or two applications can provide data identifying each other for user data sharing. In some embodiments, the two interfaces also specify the type of user data to be shared (e.g., credentials, task continuation data, etc.).

In some embodiments, the application provides its own application identifier and a set of web domains (e.g., www.xyz.com) and shared account data types (e.g., password). The device then contacts the web server at the specified domain in order to receive a certified list of associated applications for user data sharing and the types of data to be shared (e.g., signed with a certificate issued from a trusted certification authority). When the requesting application is on the list received from the web server, the device stores the verified relationship in a database in order to provide the verified account data to the application. Similarly, two applications might share data by providing each other's application identifiers to the device for verification, rather than providing a web domain. Two web domains (e.g., www.xyz.com and mobile.xyz.com) could list each other for account data sharing as well.

FIGS. 2 and 3 illustrate examples of the sharing of account data between interfaces of some embodiments. Several more detailed examples are described below. Section I describes the software architecture of the data sharing framework of some embodiments. Section II then describes the process for verifying relationships between two interfaces to a web-based service. Next, Section III describe the process of sharing data between interfaces, and gives examples of such data sharing. Finally, Section IV describes an electronic system with which some embodiments of the invention are implemented.

I. Data Sharing Verification Manager

As indicated above, in some embodiments an interface relationship verification module, or data sharing verification manager, performs two tasks related to the sharing of user account data between different interfaces to third-party services. Specifically, the data sharing verification manager of some embodiments (i) builds a database of sets (e.g., pairs) of interfaces that are verified as accessing the same third-party service and the types of data that the interfaces may share, and (ii) processes requests from the interfaces in order to verify the requests for shared data and distribute the data to the requesting interfaces. While shown as one module or background application (e.g., daemon) in this document, one of ordinary skill in the art will recognize that in some embodiments these two primary functionalities may be split between separate processes, daemons, etc.

Figure 4:
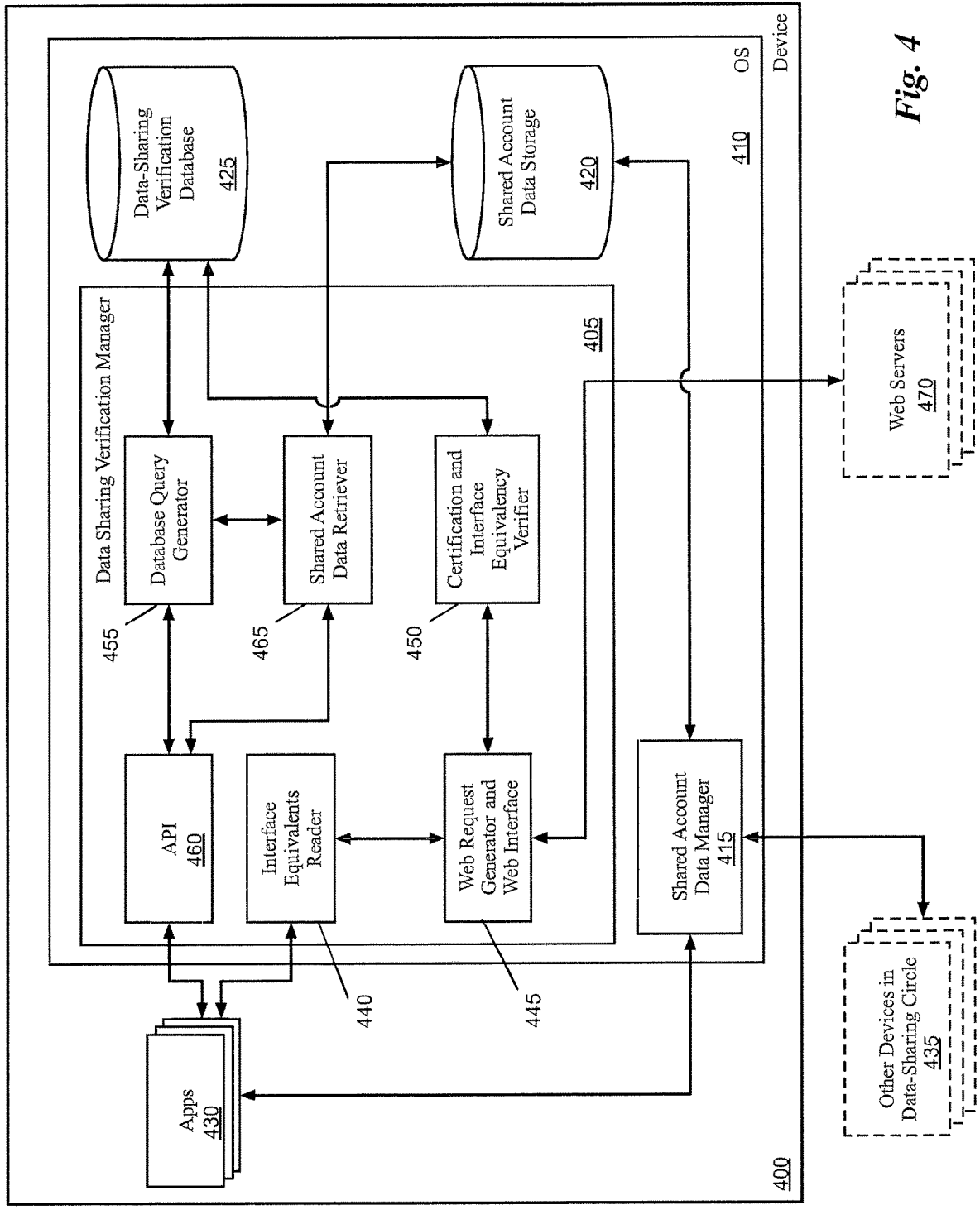
FIG. 4 conceptually illustrates a portion of the software architecture of a device on which user data sharing between interfaces is enabled FIG. 5 conceptually illustrates a process of some embodiments for verifying that a service-specific application is allowed to use data relating to interaction with a web domain.

FIG. 4 conceptually illustrates a portion of the software architecture of a device 400 on which user data sharing between interfaces is enabled. Specifically, the FIG. 4 illustrates the architecture of a data sharing verification manager 405 that operates in the operating system 410 of the device 400. In some embodiments, the data sharing verification manager 405 is an application (e.g., a daemon) that operates as part of the operating system 410, but not part of the OS kernel. As in the examples above, the device 400 may be a mobile device (e.g., a smart phone or tablet computer), a personal computer (e.g., a laptop or desktop computer), or a different type of personal electronic device.

In addition to the data sharing verification manager 405, the operating system 410 also includes a shared account data manager 415, and two storages: a shared account data storage 420 and a data-sharing verification database 425. Furthermore, a set of applications 430 operate on the device 400 outside of the operating system.

The applications 430 may include third-party service-specific applications (e.g., an application for a particular social network service, a particular streaming video service, etc.), or generic applications (i.e., applications not specific to a single third-party service) such as one or more web browser applications. The service-specific applications, in some embodiments, each provide the user of the device with an interface to their particular web-based service, allowing the user to use and interact with the service. In addition, some of the generic applications (e.g., web browser applications) enable the user of the device to access interfaces (e.g., web pages provided by web servers) for numerous different services. In some embodiments, a generic application may enable access to some of the same third-party services as the service-specific applications.

In the operating system 410, the shared account data storage 420 stores data associated with user accounts for third-party services (e.g., credentials, continuity data, etc.) accessed through the applications. As mentioned, this data may be generated automatically by the device (e.g., by an operating system module, such as the shared account data manager 415 that auto-generates passwords for third-party services), input by a user, received from a web server associated with a service, or received from a different device 435 that synchronizes shared data with the device 400. Furthermore, in some embodiments, the data may not necessarily be tied to a user account with the particular web service, but rather is simply tied to the interactions with the web service by the user of the device (possibly on both the device 400 as well as other linked device 435).

The data-sharing verification database 425 stores verified trusted relationships between different interfaces to the same third-party service. In some embodiments, each relationship stored as a record in the database 425 includes (i) two different interfaces (e.g., an application and a web domain, two web domains, two applications, etc.), (ii) the type of data that may be shared between the two interfaces (e.g., password, task continuation, etc.), and (iii) the manner in which approval for sharing the data is given (e.g., by a web server/application co-verification, by the user). The data sharing verification manager 405 builds the database using data provided by the different interfaces to indicate the relationships, then uses the database when interfaces request shared data 420, in order to verify that the requesting interface is allowed to access the requested data.

The shared account data manager 415 of some embodiments is responsible for (i) storing shared account data received or used by the applications 430 in the shared account data storage 420 and (ii) sharing this data with other devices 435 linked to the device 400. In some embodiments, the shared account data manager 415 or a related module also generates passwords for the applications to use for accounts with various third-party services. When one of the applications 430 receives data for a particular service to store for later use by either itself or a different interface to the particular service, the application stores the data in the shared account data storage 420 through the shared account data manager 415. In some embodiments, the shared account data manager 415 tags the data with information about the service and/or interface from which the data originated. For instance, for credentials received for a service accessed through a web browser, in some embodiments the shared data account manager 415 tags the credentials with the web domain (e.g., a URL) with which the data is associated.

In addition, the shared account data manager 415 handles data-sharing operations with the other devices 435 that are linked in a data-sharing (synchronization) circle with the device 400. Such data-sharing circles are explained in greater detail in application Ser. No. 13/839,050, incorporated by reference above. Essentially, a user of the device 400 may verify that the device is allowed to share the account data with other devices 435, and these devices periodically synchronize their shared account data. Thus, when one of the devices automatically generates a password for a third-party web service, the other devices can access the same account with the service. Similarly, when the user is performing a task (e.g., viewing a specific web page, viewing a streaming video, etc.) through a web service, data indicating this task (i.e., the web page and location on the page, the portion of the streaming media completed, etc.) may be shared with the other devices in the data-sharing circle.

As mentioned with respect to the database 425, the data sharing verification manager 405 (i) builds the database 425 of verified trust relationships between interfaces to third-party services and (ii) handles requests from the interfaces for the shared account data 420 generated by other interfaces. The data sharing verification manager 405 includes an interface equivalents reader 440, a web request generator and web interface 445, a certification and interface equivalency verifier 450, a database management interface 455, an application programming interface (API) 460, and a shared account data retriever 465.

The interface equivalents reader 440, in some embodiments, receives data from service-specific applications that indicates other interfaces to the same service. In some embodiments, each service-specific application that is enabled for account data sharing has an application identifier that includes a developer identifier issued by a central authority (e.g., the manufacturer of the device 400), as well as additional data. The application also includes a list of user data from particular interfaces to which it is entitled (an "entitlements" list). In some embodiments, this list includes one or more interfaces with the service with which the application interacts (e.g., application identifiers for other applications, web domains, etc.), and the type of data that the application intends to receive from those interfaces and/or share with those interfaces.

Upon receiving a list from an application (e.g., when the application is installed on the device 400, or when an update to the application is installed), the interface equivalents reader 440 passes any web domains included in the list to the web request generator and web interface 445. The web request generator and web interface 445 formats the domain (e.g., www.facebook.com) into a URL to which a web request can be sent (e.g., https://www.facebook.com/linked-apps), and sends a request to a web server 470 located at that URL (e.g., using the communication functionality of the device 400). The web request, in some embodiments, requests that the web server identify a set of interfaces (e.g., application identifiers) to the service that are equivalents of the web domain. Assuming that the application that prompted the request is validly developed and issued by the same third-party service that operates the web domain, the set of interfaces identified by the web server in its response should include the application identifier for the prompting application.

Different embodiments may use different data structures for the responses from web servers. Some embodiments use a signed plist data structure, signed using a certificate issued by a trusted certification authority. Other embodiments embed the data into the http headers of the response, which would require a more sophisticated attack to send the device 400 a fake list of applications than would using an unsigned textfile.

The certification and interface equivalency verifier 450 performs a set of checks to determine whether the relationship requested by the application will be entered into the database 425 as a verified relationship. In some embodiments, the verifier 450 first ensures that the response from the web server is validly certified (i.e., that the response comes from a web server certified as belonging to the correct entity). In some embodiments, the device 400 enforces that the connection use the Transport Layer Security (TLS) protocol, and the certification verifier validates the TLS certification chain. In other embodiments, the web server independently signs the data with a certificate issued by a certification authority, and the certification verifier 450 verifies the certificate used to sign the data.

The certification and interface equivalency verifier 450 also ensures that (i) the web server response identifies the prompting application by its correct application identifier (i.e., that the two interfaces correctly identify each other for user data sharing) and (ii) the same type of shared user data is specified by the application and the web server. When the interfaces are verified as equivalents for the same service, the certification and interface equivalency verifier 450 stores a new record in the data-sharing verification database 425 to indicate the equivalency and allow data sharing between the two interfaces (e.g., between the application and web domain). When a discrepancy exists, the verifier 450 does not store a record in the database 425. Furthermore, in some embodiments, the verifier 450 (or another module within the data sharing verification manager 405) generates an error. Different embodiments may report this error to the user, the web domain, a central authority from which the user downloaded the application, or a combination thereof.

In addition to validating the equivalency of two interfaces to a service, the data sharing verification manager 405 handles requests from applications 430 to use the shared data generated by or through the use of a different interface to the same service. In some embodiments, the data sharing verification manager receives such requests through its API 460. These requests, in some embodiments, specify the type of data requested (e.g., credentials, task continuation data, etc.), as well as the other interface that originally generated the data. For example, some embodiments request a password through the API with a call that specifies a web domain and a username. A web browser might forward a similar request from a web server that would specify either another web domain or an application identifier. The API 460 forwards these requests to the database query generator 455.

The database query generator 455 formulates a query to the data-sharing verification database 425 to determine whether to release the requested data to the requesting application. For example, in the case of the application requesting a password for a particular web domain, the database query generator queries for a record with the application identifier, the web domain, and the particular type of data requested. In response, the database 425 provides a binary (yes or no) answer. When the requested data from the particular interface is not verified, the database query manager 455 returns, through the API 460, a message to the application 430 that the application is not allowed access to the requested data. In some embodiments, the data sharing verification manager also notifies the user of the device that the application is requesting the data but is not verified for access, so that the user can take corrective action (e.g., determining whether the application is valid, and deleting the application if necessary).

When the database indicates that the requesting application (or web domain) is allowed to access the requested data, the database query generator notifies the shared account data retriever 465. The shared account data retriever retrieves the specific requested data from the shared account data storage 420, and passes this data to the requesting application through the API 460 (i.e., the API returns the requested data in this case).

While many of the features of data-sharing verification manager 405 have been described as being performed by one module (e.g., the web request generator and web interface 445 or the certification and interface equivalency verifier 450), one of ordinary skill in the art will recognize that the functions described herein might be split up into multiple modules. Similarly, functions described as being performed by multiple different modules might be performed by a single module in some embodiments (e.g., interface equivalents reader 440 and the web request generator 445 might be a single module).

In addition, some embodiments split the functionality of the data sharing verification manager into two separate daemons. For example, in some embodiments, the data sharing verification manager includes the functionality of the application entity equivalents reader 440, the web request generator and web interface 445, the certification and interface equivalency verifier 450, and the database query generator 455. A separate daemon or framework then handles the API calls for the shared account data, uses the data sharing verification manager 405 to ensure that the application making the request is allowed to receive the shared account data, and retrieves the shared account data from the storage 420. In some such embodiments, the operating system includes different frameworks for providing APIs to the applications 430, with the different frameworks each for handling requests for a different type of shared user data (e.g., a first framework or daemon for credentials requests, a second framework or daemon for task continuation requests, etc.).

II. Verification of Relationship Between Interfaces

Figure 5:
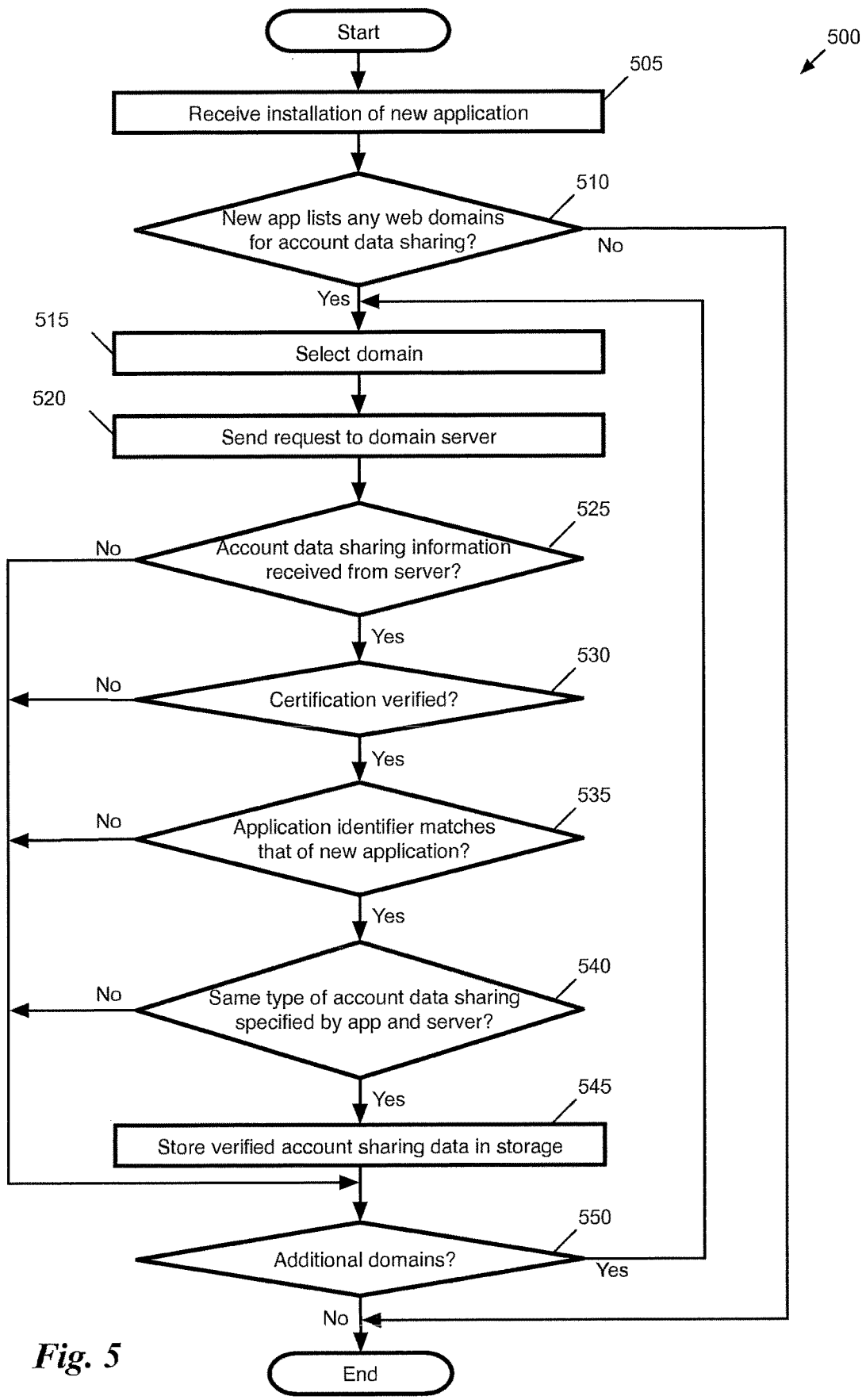

As indicated above, in order for an interface to a service to request shared data relating to that service that was generated by a different interface, some embodiments require verification that the two interfaces are both authorized by the service to share data with each other. FIG. 5 conceptually illustrates a process 500 of some embodiments for verifying that a service-specific application is allowed to use data relating to interaction with a web domain. The process 500 is performed, in some embodiments, by a data-sharing verification manager similar to that described by reference to FIG. 3. The data-sharing verification manager may operate within the operating system of a device or as a background application (daemon) on the device (e.g., on a mobile device that includes service-specific applications designed specifically for operation on such mobile devices. The process 500 will be described in part by reference to FIG. 6, which illustrates the installation of a new application on a device, and FIG. 7, which illustrates the creation of a database of verified relationships between interfaces.

This process 500, and the majority of this document, describes the case in which a service-specific application requests to use data stored based on the interaction of a web browser on the device (or a different device) with a web domain associated with the same service. However, as described, applications may request to share data with other applications, and web domains with other web domains. A similar verification process is performed irrespective of the different interfaces sharing data with each other.

As shown, the process 500 begins (at 505) by receiving the installation of a new application. In some embodiments, the data-sharing verification manager is automatically notified whenever a new application is installed on the device, or whenever an application is updated. Specifically, whenever an application is installed (or updated), the data-sharing verification manager reads a specific set of information carried by the application which lists the web domains (or other applications) with which the application requests to share data.

Figure 6:
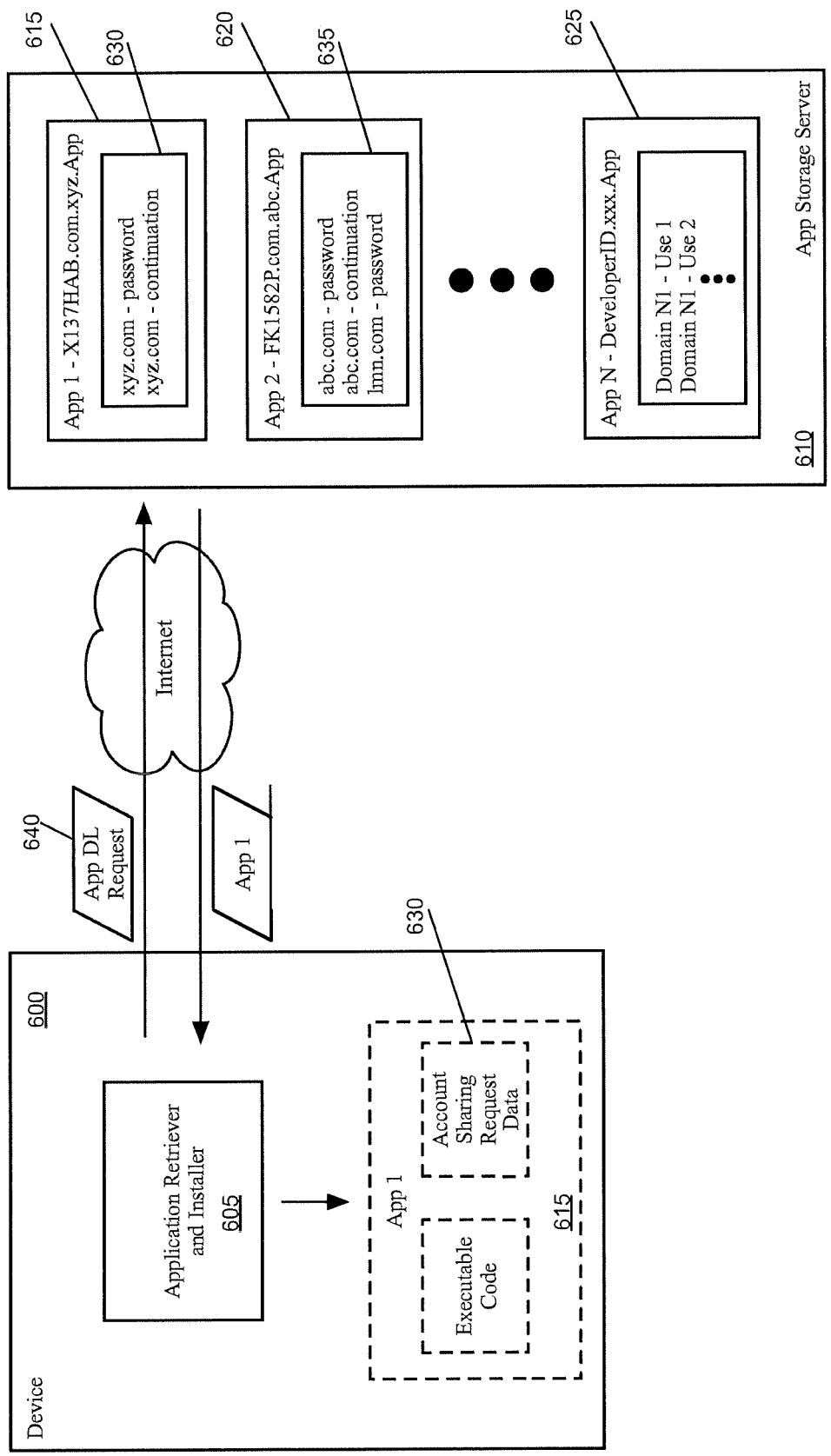
FIG. 6 conceptually illustrates the downloading and installation of an application on a device according to some embodiments.

The process then determines (at 510) whether the newly installed application lists any web domains for account data sharing. For updated applications, the process of some embodiments determines whether any new web domains are listed by the application. FIG. 6 conceptually illustrates the downloading and installation of an application on a device 600 according to some embodiments. As shown, the device includes an application retriever and installer 605. The application retriever and installer 605 may itself be an application that operates on the device to contact a centralized repository of applications available for download, either for free or for a fee. The application retriever and installer 605 may also be part of the operating system of the device. In some embodiments, the device includes an application for handling communications with the centralized repository, while the operating system of the device handles the installation.

FIG. 6 also illustrates an application storage server 610. This is a server maintained by a centralized authority to host applications approved for use on the electronic device 600 and other similar devices (e.g., an Apple® iTunes® server). The device 600 contacts the application storage server 610 through the Internet using a network connection (e.g., a WiFi connection, cellular data connection, wired connection, etc.). As shown, the application storage server 610 stores numerous applications that may be downloaded to the device 600 for installation on the device. Specifically, the figure shows a first application 615, a second application 620, and an Nth application 625.

Each of the applications 615-625 is primarily executable code, but also includes account sharing request data, also referred to as entitlements data. For each application, the entitlements data includes pairings of web domains with types of data. Specifically, the first application 615 includes entitlements data 630 with two web domain-data type pairings and the second application 620 includes entitlements data 635 with three web domain-data type pairings. The first application 615 only specifies a single web domain (xyz.com), but specifies two different types of data (passwords and task continuation). The second application 620 specifies a first web domain (abc.com) for which sharing of two types of data (passwords and continuation) is requested, and a second web domain (lmn.com) with a single type of data (passwords) for which sharing is requested. Thus, as is apparent, not only can an application request multiple types of data relating to a single web domain, but the application may request data relating to multiple web domains (including the same type of data for multiple web domains).

In some embodiments, this entitlements data 615 and 620 is a property list that is part of the code signature for the application. Thus, the entitlements data is covered by protection measures both when stored on the application storage server 610 and when loaded onto the device 600, increasing the security of the entitlements data. In addition, each application 615-625 is signed with a developer identity as part of the application identifier. Thus, a specific service may be issued a developer identity which they can then use to sign the application.

In FIG. 6, the device 600 sends a request 640 to the application storage server 610 for the first application 615. In response, the application storage server 610 transfers the application 615 to the device 600. In some embodiments, the device 600 actually sends the request to a separate server affiliated with the application storage server 610, which directs the application storage server 610 to download the application to the device 600. This enables a separate server (or set of servers) to take care of any fees paid for the application, validation of the device requesting the application, etc.

Upon receiving the application 615, the application retriever and installer 605 installs the application on the device 600. As shown, the application 615 includes executable code (i.e., the code that enables the application to function on the device) and account sharing request data 630. At this juncture, the data sharing verification manager (not shown in this figure) would examine the account sharing request data and verify the web domains specified by the application.

Returning to FIG. 5, when the newly installed application or application update does not list any web domains for account data sharing, the process ends. When at least one web domain is listed by the application, the process begins verifying the web domains. The process selects (at 515) one of the listed web domains. Some embodiments process the web domains in the order in which they are listed within the application, while other embodiments may use another order (e.g., randomly, alphabetical order, etc.). Furthermore, while the process 500 is a serial, linear process in which one listed web domain is verified at a time, one of ordinary skill in the art will recognize that some embodiments perform operations 520-545 in parallel for each of the listed web domains.

For the selected web domain, the process sends (at 520) a request to the web server at that domain. In some embodiments, the data sharing verification manager on the device formulates the full URL based on the domain listed in the application, then sends the request to that full URL. For instance, if the application lists xyz.com as a domain, then the verification manager of some embodiments forms the URL https://xyz.com/linked-apps. Some embodiments require that the web servers be accessed through a secure connection using TLS, and thus must be a https URL. In addition, some embodiments specify that the web servers will have the list of authorized applications available at a specific path (e.g., "linked-apps"), thereby simplifying the URL formulation. The process 500 then sends a request to the generated URL.

Upon receiving a reply, the process 500 performs a series of verification operations. Different embodiments may perform these operations in a different order than that shown in FIG. 5, or may perform the various operations in parallel. Here, the process determines (at 525) whether account data sharing information is received from the server at the formulated URL. If the server does not respond to the request, then the data sharing verification manager assumes that the domain is not set up to verify other interfaces (e.g., service-specific applications) for account data sharing on a device. Similarly, the server might respond with a null list. In either case, the process proceeds to 550, described below.

On the other hand, the process may receive a valid list from the server. Different embodiments use different methods for securing the transaction between the server and the device. For example, some embodiments enforce that the server use the TLS protocol for the connection in order for the received list to be considered valid. In other embodiments, the web server independently signs the data with a certificate issued by a certification authority. Essentially, the device only accepts a list of authorized applications if the web server sending the list meets a particular security standard. The received list may be in different forms (e.g., different data structures) in different embodiments. Some embodiments use a signed plist data structure, signed using a certificate issued by a trusted certification authority. Other embodiments embed the data into the http headers of the response, which would require a more sophisticated attack to send the device a fake list of applications than would using an unsigned textfile.

If a valid list is received from the web server, then the process 500 determines (at 530) whether the web server's certification is verified. For example, when the connection is secured with the TLS protocol, the data sharing verification manager on the device authenticates the entire certification chain. If the data structure sent by the web server is signed in a different manner, then the device authenticates this signature to establish a requisite level of trust that the received data is from a proper source. If the certification cannot be verified, then the process proceeds to 550.

If the server is verified, the process determines (at 535) whether one of the application identifiers received from the web server matches that of the newly installed application. As mentioned, the application includes an application identifier that specifies the developer of the application as well as additional data indicating the specific application (as a single developer may produce numerous applications). In some embodiments, the application identifier also identifies a version of the application, in case only certain versions have data sharing privileges. Much like the account sharing request data from the application shown in FIG. 6, the list received from the web server includes application-data type pairings (or web domain-data type pairings, if allowing data sharing between different web domains). Thus, if the web server list does not specify the application for account data sharing at all, the process proceeds to 550.

On the other hand, if the list received from web server does specify the application by its identifier as a valid recipient of shared account data associated with the web domain, then the process determines whether the same type of user data sharing is specified by both the application and the web server (i.e., by the two interfaces). For instance, if the application requests password information, but the web server only authorizes the sharing of task continuation data, then the device will not validate data sharing between the two interfaces. If the application specifies multiple types of data for a web domain (i.e., as with the account sharing request data 615 in FIG. 6) and the web server only specifies one of these types of data (or a subset of the data types), then some embodiments authorize the types of data that overlap. If the requested data type is not authorized by the web server, then the process proceeds to 550. While operations 535 and 540 are shown as separate operations, some embodiments evaluate these together for each web domain-data type pairing specified by an application, and validate or deny each such request from the application separately.

When the web domain-data type pairing is validated by both the application and the web domain, then the process 500 stores (at 545) the verified sharing data in a storage (e.g., the database 425 shown in FIG. 4 above). The data sharing verification manager uses this database when the application code makes a specific request for data (as compared to the generic request to validate data sharing performed by the process 500).

After storing the verified account sharing data in the storage, the process determines (at 550) whether the application listed additional web domains in the account sharing request data. If additional web domains remain, the process returns to 515 to select the next domain. Otherwise, the process 500 ends.

Figure 7:
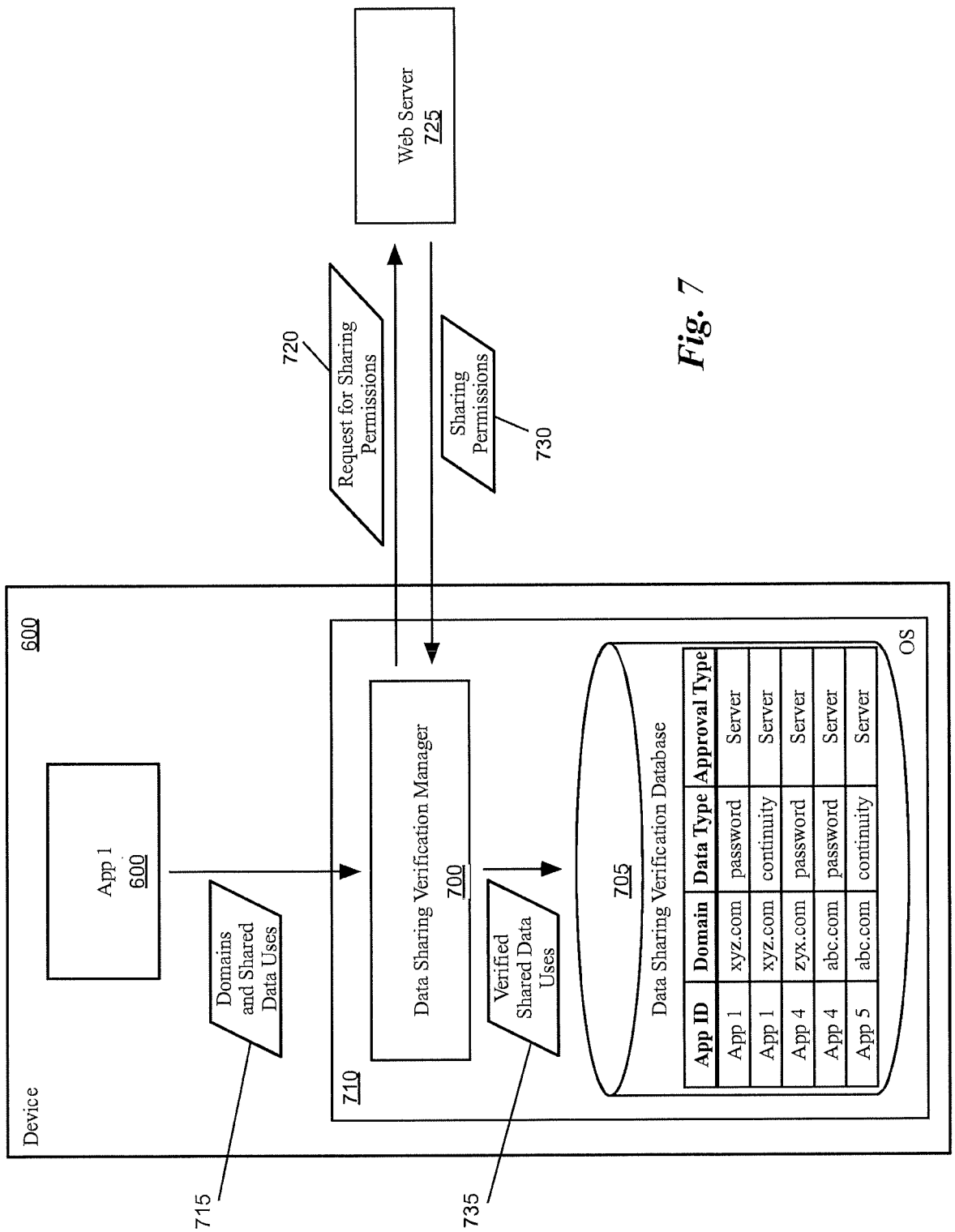
FIG. 7 conceptually illustrates the device from FIG. 6 after the installation of the application on the device.

FIG. 7 conceptually illustrates the device 600 (from FIG. 6) after the installation of the application 615 on the device. This figure does not show the application retriever and installer 605, but instead illustrates the data sharing verification manager 700 and the data sharing verification database 705, which in some embodiments are part of the operating system 710. The data sharing verification manager 700 and data sharing verification database 705, in some embodiments, function in a similar manner to the data sharing verification manager 405 and data sharing verification database 425 described above by reference to FIG. 4.

As shown, after the application 615 is installed, the application provides the data sharing verification manager 700 with a set 715 of domains and shared account data uses (i.e., data types). This is the account sharing request data 630. In this case, the data 630 includes one web domain (xyz.com) with two different types of data (password and continuity data). The verification manager 700 formulates a request 720 to the web server 725 at the URL https://xyz.com/linked-apps, or a similar URL. The web server 725 responds with its signed account data sharing permissions 730 (e.g., in http headers, as a signed plist data structure, or in another manner).

When the verification manager 700 receives the data 730 from the web server, the verification manager authenticates the web server and/or the data 730, and compares this data to the application identifier of the application 615 as well as the requested shared account data uses for the web domain xyz.com specified by the application (as described for operations 530-545 above). In this case the web domain-data type pairings are verified, and the verification manager 700 stores verified data 735 in the database 705.

As shown, the database 705 of some embodiments stores a set of records that each indicates a validated pair of interfaces (e.g., a web domain and an application) and a data type that may be shared between the interfaces. In addition, for each record, the database specifies the type of approval. In this case, each of the five records in the database 705 is a pairing of an application with a web domain, though some embodiments may include other types of pairings (e.g., two web domains, two applications, or other types of interfaces). Furthermore, some embodiments may store more than two interfaces (e.g., rather than storing three records to indicate that two applications and a web domain may share passwords with each other, some embodiments allow the database to store a single record with all three interfaces). The records in the database 705 include two records for application 715 (both with the domain xyz.com), two records for a second application (App 4) with two different domains, and a fifth record for a third application (App 5), with one of the domains with which the second application also shares data, though for a different data type. The approval type, in some embodiments, differentiates between approval by a web server and approval by user input, if allowed. This database 705 may be used by the data sharing verification manager when applications operating on the device 600 request access to the specific account data stored on the device.

III. Sharing Data Between Interfaces

The above section describes the verification process to build a database (or other storage) of verified trust relationships between interfaces to the same service. Once a record in this database is created for a pair of interfaces, one of those interfaces can then access data stored on the device that was generated through the other interface in the pairing. For instance, the devices of some embodiments store data (e.g., password data) relating to various web-based third-party services (e.g., streaming video or audio services, social media websites, banking or other financial sites, etc.).

Figure 8:
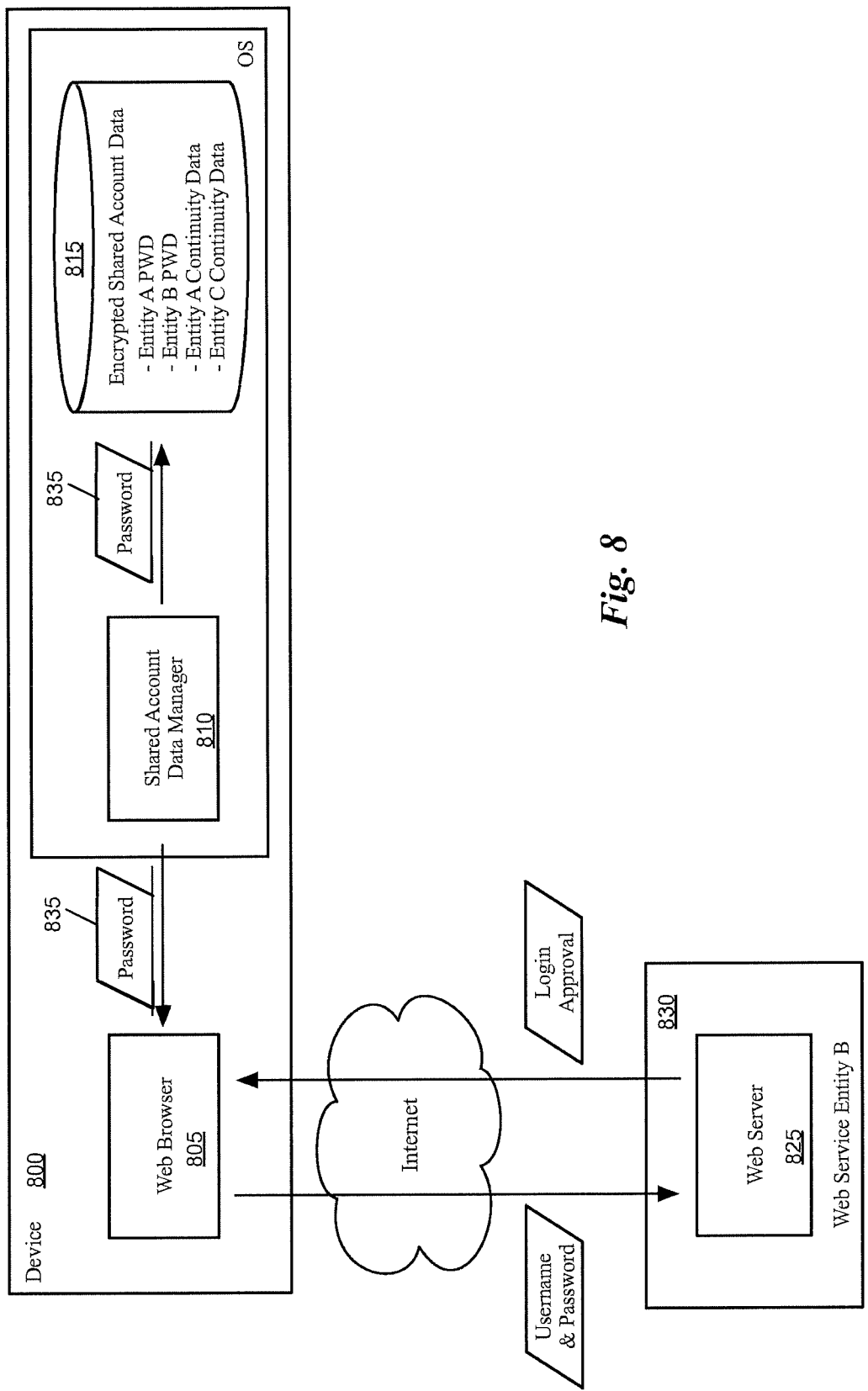
FIG. 8 conceptually illustrates a device of some embodiments generating and storing shared account data in a storage for such data on the device.

FIG. 8 conceptually illustrates a device 800 of some embodiments generating and storing shared account data in a storage for such data on the device. Specifically, the device includes a web browser application 805, a shared account data manager 810, and a storage 815 for storing encrypted shared account data. The shared account data manager 810 and the storage 815 are part of the operating system in some embodiments.

The shared account data manager 810, in some embodiments, performs similar functions to the data manager 415 in FIG. 4, described above. That is, the shared account data manager 810 handles the storage of data related to accounts with third-party web services, as well as the synchronization of that data between multiple devices that are authorized to share such data with each other. In some embodiments, as is the case in FIG. 8, the shared account data manager 810 (or a separate module) automatically generates randomized passwords for third-party web services.

In this figure, the web browser 805 is in communication with the web server 825, which is a server for the web service entity 830. This entity might be a streaming video service, a banking or other financial service, a social media service, a fantasy sports service, or any other type of web service that requires a login. In this example, the user of the device 800 intends to create a new user account with the web service 830. In order to create the account, the user is required to supply a username (which the user may generate) and password to the web server 825. Thus, the user inputs a username, and the shared account data manager 810 automatically generates a randomized password 835.

The shared account data manager (i) hands off the generated password to the web browser 805 and (ii) stores the generated password in the encrypted shared account data 815. The web browser uses this generated randomized password 835, as well as a username (typically input by the user of the device) to send a message 840 to the web server 825. The web server 825, so long as the username and password are formatted within the rules of the web service 830, sends back an approval 845.

The storage of the password 835 into the storage 815 enables the later use of this password to access the web service, which means that the user does not need to remember every password for every web service. This is especially important when the password is automatically generated, and therefore harder for a human to remember. The shared account data stored in the storage 815 may be shared to other devices, as well as to other authorized interfaces with the web server 825. In this example, the shared account data stores several passwords and task continuation data relating to recent interactions with several services, including one of the services for which a password is stored. Some embodiments, as in this case, encrypt the shared account data for enhanced security, as the shared account data stores passwords and other secure information.

Once this shared account data is stored on the device, other interfaces to the same web service may request the data. For instance, after the user creates an account through a third-party web service, the user may download an application specifically designed for easy access to the web service. So long as this application is verified by the web domain associated with the third-party service, then the application can use the password (or other shared account data) stored on the device.

Figure 9:
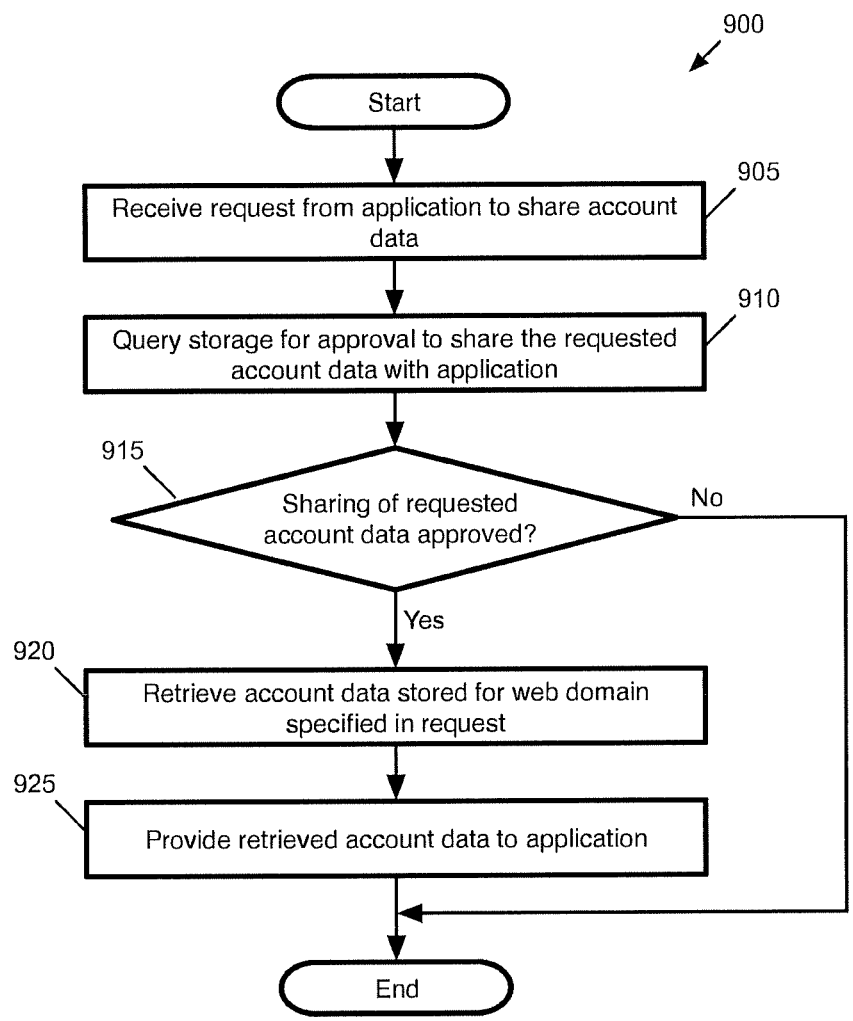
FIG. 9 conceptually illustrates a process performed by the device to retrieve shared account data, stored based on interaction with a web domain through a web browser, for an application.

FIG. 9 conceptually illustrates a process 900 performed by the device to retrieve shared account data, stored based on interaction with a web domain through a web browser, for an application. In some embodiments, the process 900 is performed by a data sharing verification manager (e.g., manager 405 from FIG. 4 above) that is part of the operating system of the device or runs as a background application (daemon) on the device.

As shown, the process 900 begins by receiving (at 905) a request from an application to share account data that was generated via interaction with a web domain through a web browser. In some embodiments, this request is received through an API call as part of the executable code of the application. That is, the developer of the application (e.g., a third-party developer) writes in a call to request a specific type of shared account data from the device. In some embodiments, when requesting a password, this request is formatted as a function call with the web domain (written into the code) and username (supplied by the user of the device).

In response to receiving such a request, the process 900 queries (at 910) a storage (e.g., the data sharing verification database) for approval to share the requested account data with the application. As shown in FIG. 7, the data sharing verification database stores pairings of interfaces to the same third-party service for which account data sharing has been verified (e.g., applications paired with web domains), and the types of account data that may be shared between the interfaces. The request is received from an application with a specific application identifier, and therefore the data sharing verification manager queries this database for a record with the specific application identifier, the web domain specified in the request, and the type of data specified in the request. Similarly, a request from a web domain for shared data might specify an application identifier, and a similar query would be formulated for the database.

Upon receiving the response to this query from the database, the process determines (at 915) whether sharing of the requested account data to the requesting application is approved. When a record with the two interfaces and the specific data type does not exist in the database (or exists but is flagged as non-approved), then the process 900 ends. In some embodiments, the device also notifies the application to let it know that the data-sharing request has been denied (so that the application can then prompt the user for a password, or take other action). In some embodiments, the data sharing verification manager also performs the operations 525-540 shown in FIG. 5, to attempt to verify the application for receiving data generated through the specified web domain. In this sense, the data sharing verification database is not required in some embodiments, as the data sharing verification manager could interact with the web server each time an application requested shared data. However, storing the information in the data sharing verification database prevents the inefficiency of repeated requests to the web server, which is slower than checking a data tuple stored on the device.

When the request is verified, the process retrieves (at 920) account data stored for the web domain specified in the request. As mentioned above, some embodiments store the shared account data with tags indicating the source of the data (e.g., a web domain, an application, or a different interface to a third-party service) as well as its data type. Thus, the password for www.xyz.com would have a tag indicating that it is a password as well as a tag indicating the domain www.xyz.com. This enables the data sharing verification manager to retrieve the correct data from the storage. Data stored based on interaction with a service through a service-specific application is tagged, in some embodiments, with the application identifier. Thus, when a web domain or other application requests the data from the service-specific application using the application's identifier, the data sharing verification manager can retrieve the data using this identifier as well. The process then provides (at 925) the retrieved account data to the application, then ends.

FIGS. 10-13 illustrate several examples of the storage and subsequent use of shared user data according to some embodiments of the invention. Each of these figures includes several stages which illustrate a combination of (i) the graphical user interface (GUI) displayed on one or more devices and (ii) the transfer of shared user data within those devices.

Figure 10:
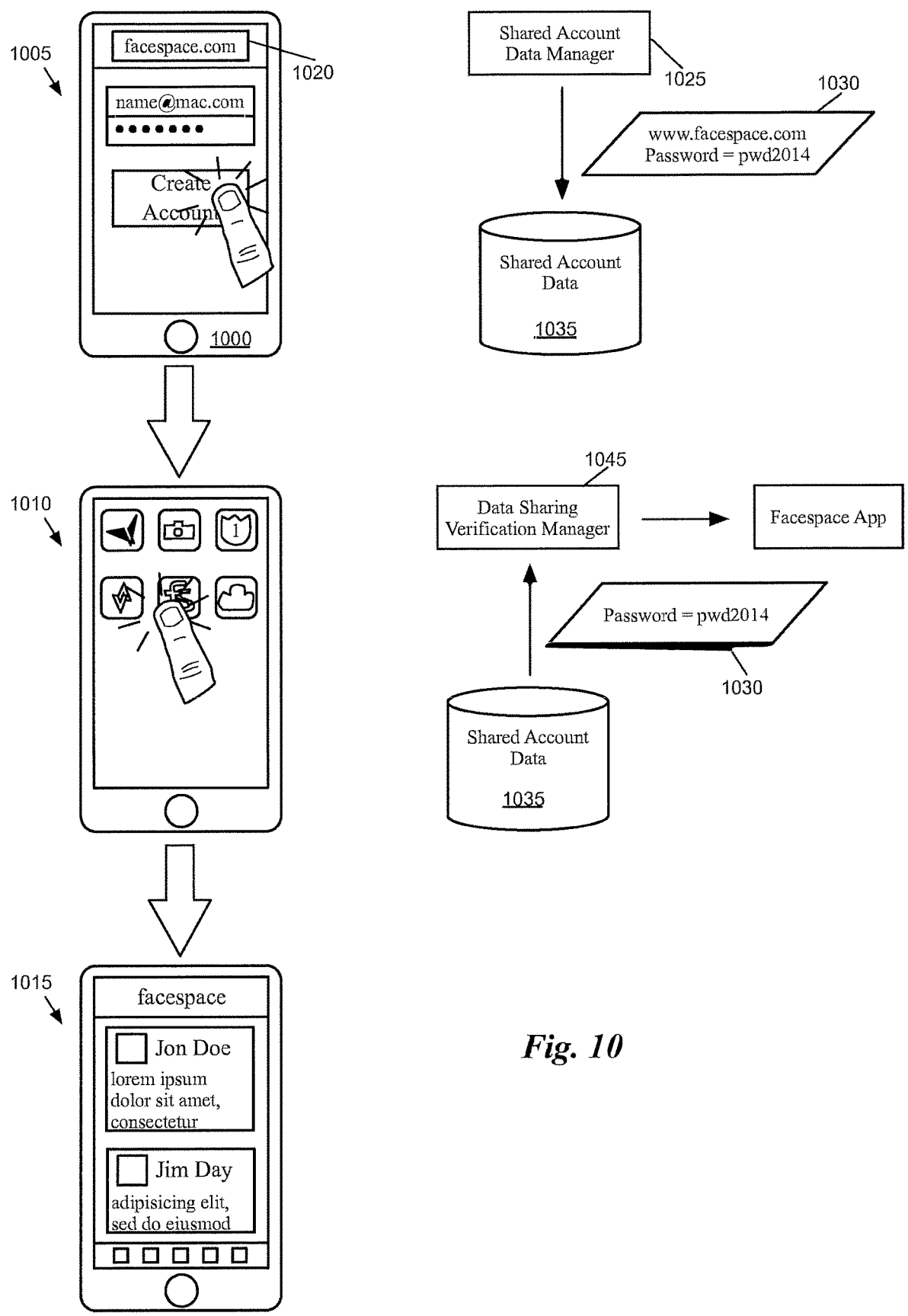
FIG. 10 illustrates an example of a mobile device storing a password for a third-party web service accessed through a web browser, then providing this password automatically to a service-specific application that accesses the same third-party web service.

FIG. 10 illustrates an example, over three stages 1005-1015, of a mobile device 1000 storing a password for a third-party web service (facespace.com) accessed through a web browser, then providing this password automatically (i.e., without any user input other than opening the application) to a service-specific application that accesses the same third-party web service. In some embodiments, as shown in these examples, the mobile device is a touchscreen device such as a touchscreen smartphone or tablet.

In the first stage 1005, the user utilizes a web browser application on the mobile device 1000 to access a third-party web service at the URL facespace.com, as shown in the URL bar 1020 of the web browser GUI shown on the device 1000 (the URL actually being (https://www.facespace.com). The user, at this stage, creates a new account for this web service. In some embodiments, the password (shown on the screen as a set of black circles) is auto-generated by the device 1000, while in other embodiments the user enters the password. As shown in the right half of this first stage 1005, upon creation of the account, a shared account data manager 1025 operating in the device 1000 (e.g., within the operating system of the device) stores the password data 1030 in a shared account data storage 1035. The shared account data manager 1025 tags the data with the web domain (www.facespace.com) for which the password is used.

By the second stage 1010, the user has completed their actions through the web browser on facespace.com, which may have included downloading a service-specific native application to access the facespace servers. In the second stage 1010, the user selects an application icon 1040 through the touchscreen of the mobile device 1000. In response, the application requests password information from the data sharing verification manager 1045. The data sharing verification manager verifies that the application is authorized to receive the requested password data (e.g., by querying a database of such authorized relationships, as described above). Then, so long as the application is verified to receive the data, the data sharing verification manager 1045 retrieves the password information and passes it to the application, as shown on the right side of this stage 1010.

The third stage 1015 illustrates the result of these operations. At this stage, the native facespace application automatically logs into the facespace servers (e.g., mobile application servers provided by the facespace entity). The application downloads the user's data from the servers and displays that data in the application. The user does not need to enter any sort of authentication data into the application in order to log in.

Figure 11:
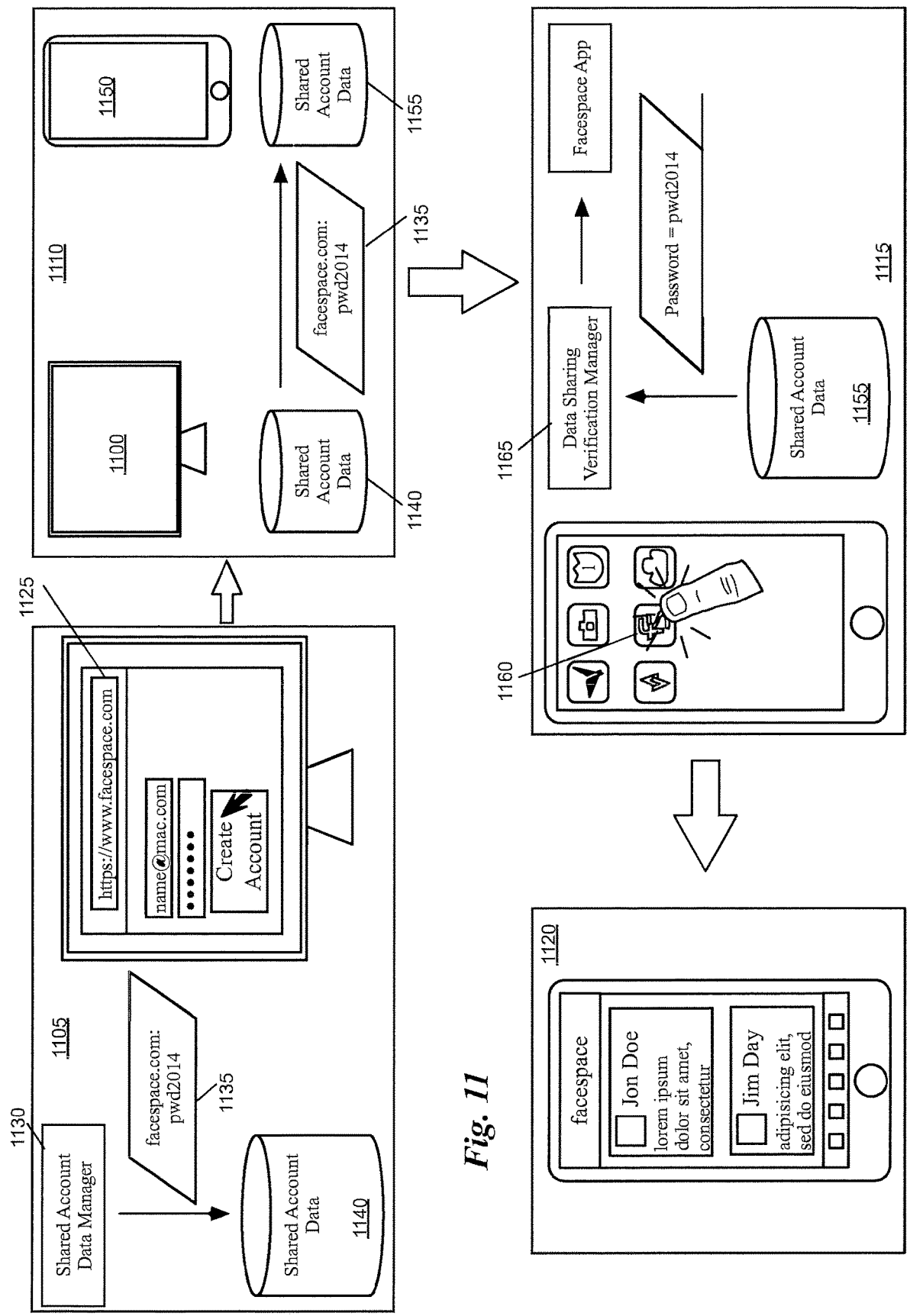
FIG. 11 illustrates an example of a desktop computer storing a password for a third-party web service accessed through a web browser, sharing the data with a linked mobile device, and the mobile device automatically providing the password to a service-specific application that accesses the same third-party web service.

FIG. 11 illustrates an example, over four stages 1105-1120, of a desktop computer storing a password for a third-party web service (again, fasespace.com) accessed through a web browser, sharing the data with a linked mobile device, and the mobile device automatically providing the password to a service-specific application that accesses the same third-party web service. As in the previous example, the mobile device is a touchscreen device such as a touchscreen smartphone or tablet.

In the first stage 1105, the user utilizes a web browser application on the desktop computer 1100 to access a third-party web service at the URL https://www.facespace.com, as shown in the URL bar 1125 of the web browser GUI shown on the desktop computer 1100. The user, at this stage, creates a new account for this web service. In some embodiments, the password (shown on the screen as a set of black circles) is auto-generated by the device 1100, while in other embodiments the user enters the password. As shown in the left half of this first stage 1105, upon creation of the account, a shared account data manager 1130 operating in the device 1100 (e.g., within the operating system of the device) stores the password data 1135 in a shared account data storage 1140. The shared account data manager 1130 tags the data with the web domain (www.facespace.com) for which the password is used.

The second stage 1110 illustrates that the stored password data 1135 is shared from the desktop computer 1100 to a mobile device 1150. Specifically, the data is transferred from the shared account data storage 1140 on the desktop computer to a shared account data storage 1155 on the mobile device. In some embodiments, this transaction is facilitated by the shared account data manager 1130 on the desktop computer and a shared account data manager on the mobile device. Although the desktop computer and mobile device run different operation systems (e.g., Mac OS vs. iOS), the devices have the ability to share account or other user data with each other when the devices are linked so that the joint user of the two devices does not have to re-enter passwords on the separate devices. In some embodiments, the desktop computer 1100 (through its shared account data manager) uploads the data password 1135 to an account on a cloud-based service that all of the user's devices subscribe to, which pushes the data 1135 to the mobile device 1150 (though the shared account data manager of the mobile device).

By the third stage 1115, the user is now utilizing the mobile device 1150. In this stage, the user selects an application icon 1160 through the touchscreen of the mobile device. In response, the application requests password information from the data sharing verification manager 1165 that operates in the OS of the mobile device. The data sharing verification manager verifies that the application is authorized to receive the requested password data (e.g., by querying a database of such authorized relationships, as described above). Then, so long as the application is verified to receive the data, the data sharing verification manager 1165 retrieves the password information and passes it to the application, as shown on the right side of this stage 1115.

The fourth stage 1120 illustrates the result of these operations. At this stage, the native facespace application automatically logs into the facespace servers (e.g., mobile application servers provided by the facespace entity). The application downloads the user's data from the servers and displays that data in the application. As in the previous example, the user does not need to enter any sort of authentication data into the application in order to log in.

Both of these examples involved password data generated through a web browser (either on the mobile device or on a separate device), then shared with a native service-specific application on the web browser. Similarly, a user could download a service-specific application, create an account with the web service through that application, and then the password data for the account would be shared with the web browser on the device as well as with any other devices of the users, so long as the application and web domain were verified for user data sharing.

Figure 12:
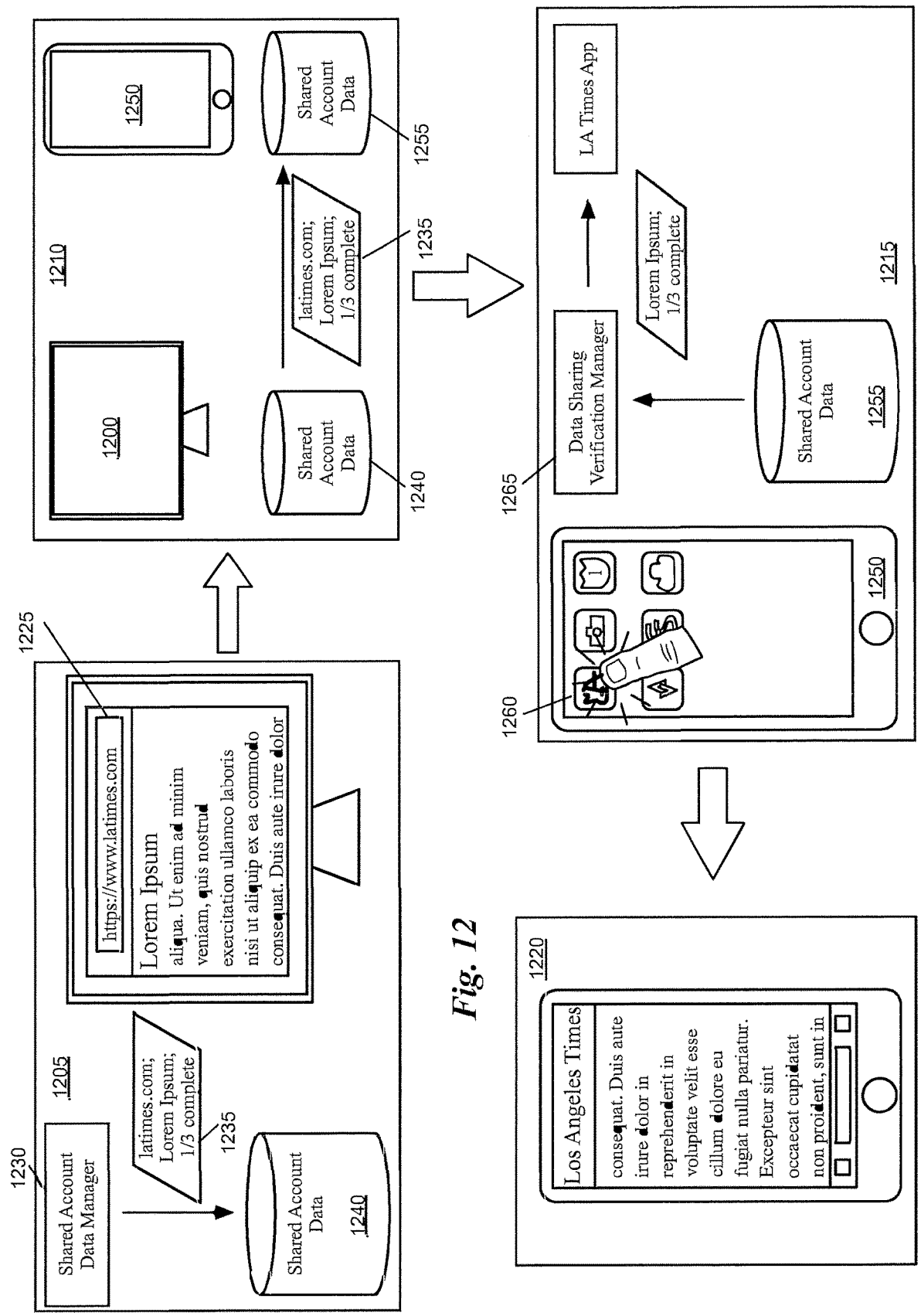
FIG. 12 illustrates an example of a user viewing a news article on a web browser on a desktop computer, the desktop computer storing data regarding the user's progress through the article and sharing this information with a linked mobile device, and the mobile device automatically using this data to bring the user to the same location in the news article.
Figure 13:
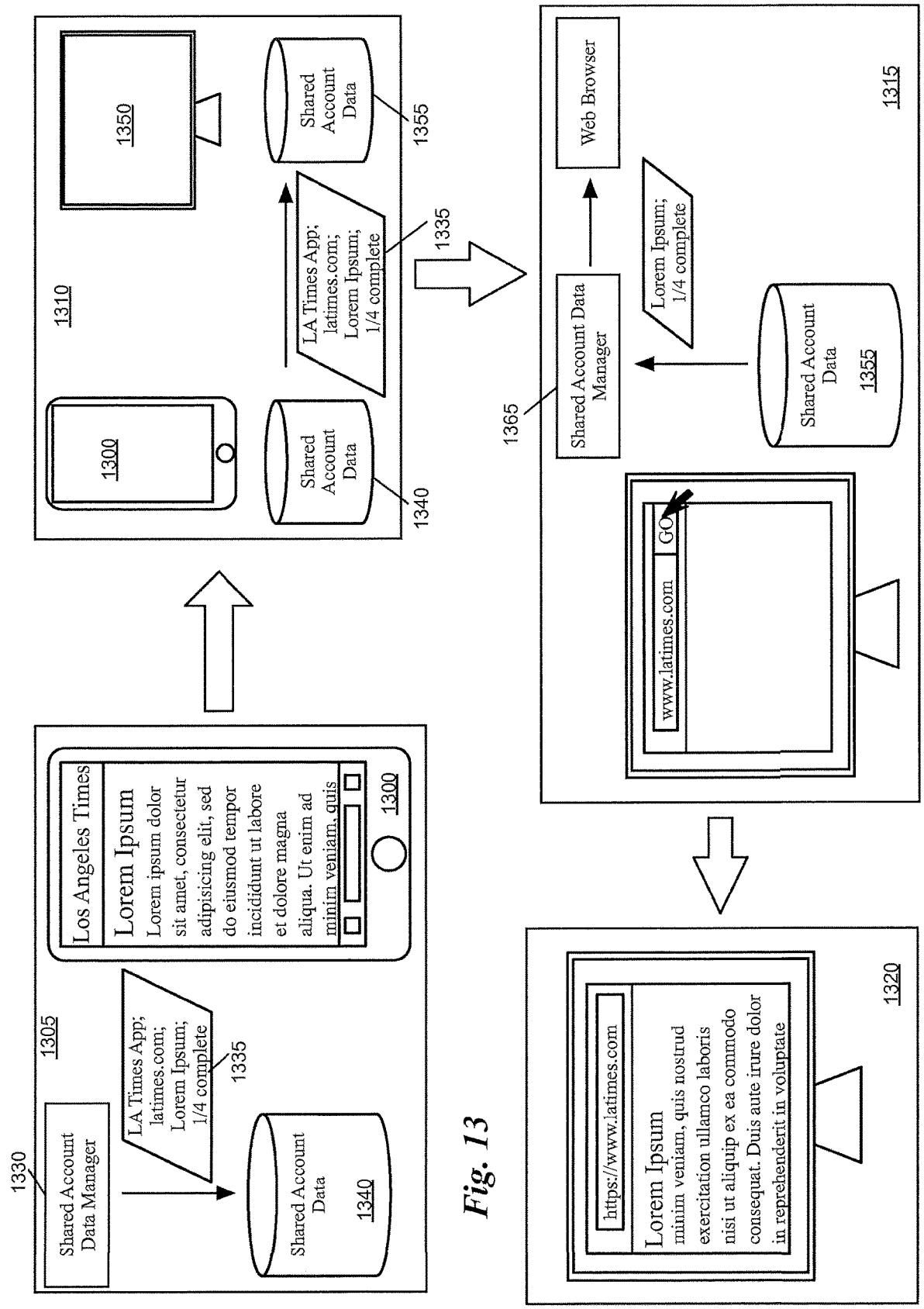
FIG. 13 illustrates an example in which a user views a news article on a native service-specific application on a mobile device, which stores the task progress data for the article and shares the information with a linked desktop computer, and the desktop computer then automatically uses this data to bring the user to the same location in the news article.

While FIGS. 10 and 11 illustrate the sharing of password data, FIGS. 12 and 13 illustrate sharing task continuation data. The task continuation data, in some embodiments, enables a user performing a task through a web-based service (e.g., viewing a streaming video, reading an article from a news website, viewing an event on a social media website, reviewing a stream of photos on a photo-sharing website, etc.) to continue the task when they switch devices. In some embodiments, this data need not be linked to an account with the web-based service, but is driven by the device stored for the web-based service on the user's devices, and shared between devices as described above for the password data. In some embodiments, the data sharing between different interfaces allows applications and web browsers to validate each other for task continuation, allowing a user to start a task on a web browser and continue the task through a service-specific native application (either on the same device as the web browser, or a different device), or vice versa.

FIG. 12 illustrates an example, over four stages 1205-1220, of a user viewing a news article on a web browser on a desktop computer, the desktop computer storing data regarding the user's progress through the article and sharing this information with a linked mobile device, and the mobile device automatically using this data to bring the user to the same location in the news article.

In the first stage 1205, the user utilizes a web browser application on the desktop computer 1200 to access a third-party news website at the URL https://www.latimes.com, as shown in the URL bar 1225 of the web browser GUI shown on the desktop computer 1200. The user, at this stage, is viewing an article ("Lorem Ipsum") on the desktop computer, and is a portion of the way through this article. As shown in the left half of this first stage 1205, the shared account data manager 1230 on the desktop computer tracks the user's progress for this web domain, and stores the task progress data 1235 in the shared account data 1240. In some embodiments, the shared account data manager 1230 tracks this information either continuously or at regular intervals as the user progresses through the article, while in other embodiments the shared account data manager only stores the progress information once the user either minimizes or closes the web browser window, closes the web browser application, or ceases using the application or computer 1200 for a specified amount of time.

The second stage 1210 illustrates that the stored task progress data 1235 is shared from the desktop computer 1200 to a mobile device 1250. Specifically, this data is transferred from the shared account data storage 1240 on the desktop computer to a shared account data storage 1255 on the mobile device. In some embodiments, this transaction is facilitated by the shared account data manager 1230 on the desktop computer and a shared account data manager on the mobile device, as described above for FIG. 11. Similarly, as indicated above, this transaction may take place through an account on a central cloud-based service.

By the third stage 1215, the user is now utilizing the mobile device 1250. In this stage, the user selects an application icon 1260 through the touchscreen of the mobile device. In response, the application requests any task progress data for the web domain www.latimes.com that is stored in the shared account data 1255. The data sharing verification manager 1265 verifies that the application is authorized to receive the requested task progress data (e.g., by querying a database of such authorized relationships, as described above). Then, so long as the application is verified to receive the data, the data sharing verification manager 1265 retrieves the data indicating the task (i.e., an article being read) as well as the user's progress through that task, and passes the data to the application, as shown on the right side of this stage 1215.

The fourth stage illustrates the result of these operations. At this stage, the native LA Times application automatically opens to the Lorem Ipsum article, at the point at which the user had stopped reading. The application uses the data, in some embodiments, to send a request for the specific article to the LA Times servers, then automatically displays the appropriate portion of the article once it is received.

FIG. 13 illustrates an example of the opposite flow to FIG. 12. In this figure, over four stages 1305-1320, a user views a news article on a native service-specific application on the mobile device, which stores the task progress data for the article and shares the information with a linked desktop computer, and the desktop computer then automatically uses this data to bring the user to the same location in the news article.

In the first stage 1305, the user utilizes a LA Times application on the mobile device 1300 to access the LA Times servers and view a news article ("Lorem Ipsum"). The user is a portion of the way through this article at this juncture. As shown in the left half of this first stage 1305, the shared account data manager 1330 on the mobile device tracks the user's progress for this web service, and stores the task progress data 1335 in the shared account data 1340. As in the previous example, different embodiments may track the progress at regular intervals or when the user closes or hides the application. In some embodiments, the mobile device tags the task progress data from the application with information indicating that it came from the LA Times application.

In some embodiments, the shared account data manager also uses the data sharing verification manager on the mobile device to query the data sharing verification database as to whether the stored data should be tagged for any web domains as well. For instance, in some embodiments the verification manager queries the database using the 2-tuple of application identifier (LA Times app) and data type (task continuation) to determine whether any of the records in the database specify any web domains. The shared account data manager then tags the data with these web domains as well. In some cases, this could result in data being tagged with one or more applications and one or more web domains.

The second stage 1310 illustrates that the stored task progress data 1335 is shared from the mobile device 1300 to a desktop computer 1350. Specifically, this data is transferred from the shared account data storage 1340 on the mobile device to a shared account data storage 1355 on the desktop computer. In some embodiments, this transaction is facilitated by the shared account data manager 1330 on the mobile device and a shared account data manager on the desktop computer, as described above for FIG. 11 (only in the opposite direction). Similarly, as indicated above, this transaction may take place through an account on a central cloud-based service.

By the third stage 1315, the user is now utilizing the desktop computer 1350. In this stage, the user has opened a web browser, typed "www.latimes.com" into the URL bar of the browser, and selected an item in the web browser GUI to direct the browser to that URL (or hit the "Enter" key, etc.). In some embodiments, either the web server directs the web browser to request task progress data or the web browser requests task progress data on its own from the shared account data 1355. As this data has already been tagged with the "www.latimes.com" domain, the data is accessible to the web browser on the desktop computer 1300.

As a result, the fourth stage 1320 illustrates that the web browser automatically opens to the Lorem Ipsum article, at the point at which the user had stopped reading. The web browser uses the data, in some embodiments, to send a request for the specific article to the www.latimes.com servers, then automatically displays the appropriate portion of the article once
it 1s received. In some embodiments, however, the data is not already tagged for the www.latimes.com web domain, and the desktop computer would have had to import the data sharing verification database information from the mobile device 1300. In such embodiments, the web browser would request data from a data sharing verification manager in the desktop computer operating system.

The above examples illustrate data sharing between a mobile device and a desktop computer, for either password or task progress (task continuation) data. One of ordinary skill in the art will recognize that different types of user data might be shared between devices, as well as that other types of devices might be involved. For instance, mobile devices might share user data with other mobile devices (e.g., smart phone and table computer, smart phone and media player, etc.), computers could share data with each other (e.g., two desktop computers, two laptop computers, a laptop and a desktop, etc.), laptops could share data with mobile devices and vice versa, etc., so long as the two devices are authorized for such user data sharing.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 14:
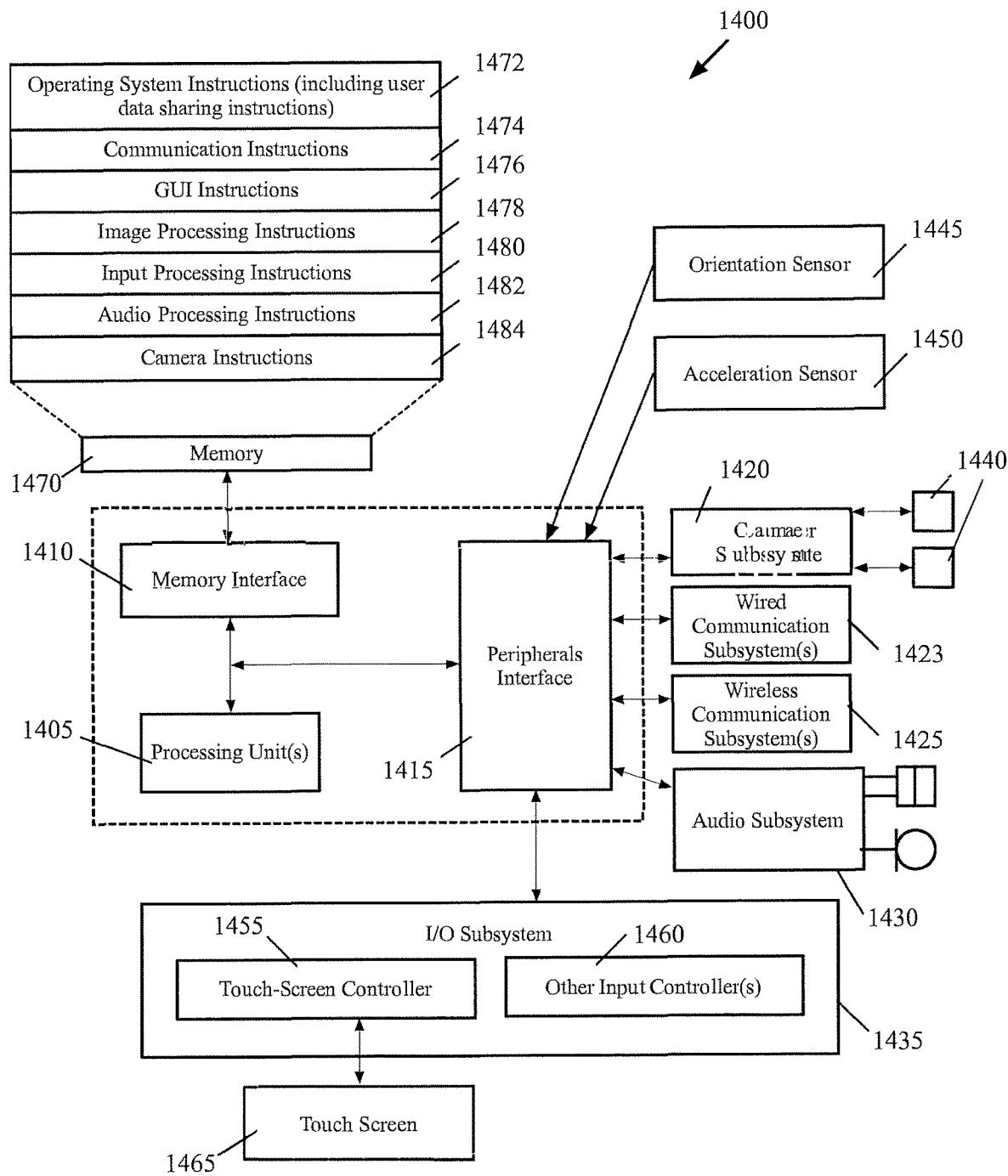
FIG. 14 is an example of an architecture of a mobile computing device.

The user data sharing of some embodiments occurs on mobile devices, such as smart phones (e.g., iPhones®) and tablets (e.g., iPads®). FIG. 14 is an example of an architecture 1400 of such a mobile computing device. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wired communication subsystem(s) 1423, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wired communication subsystem 1423 and wireless communication subsystem 1425 serve to facilitate communication functions.

In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions in some embodiments.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks. In addition, in some embodiments, the OS instructions 1472 include instructions for various non-kernel operations, such as the data sharing verification manager and the shared account data manager described above.

The memory 1470 also includes communication instructions 1474 to facilitate communicating with one or more additional devices (e.g., for peer-to-peer data sharing, or to connect to a server through the Internet for cloud-based data sharing); graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

B. Computer System

Figure 15:
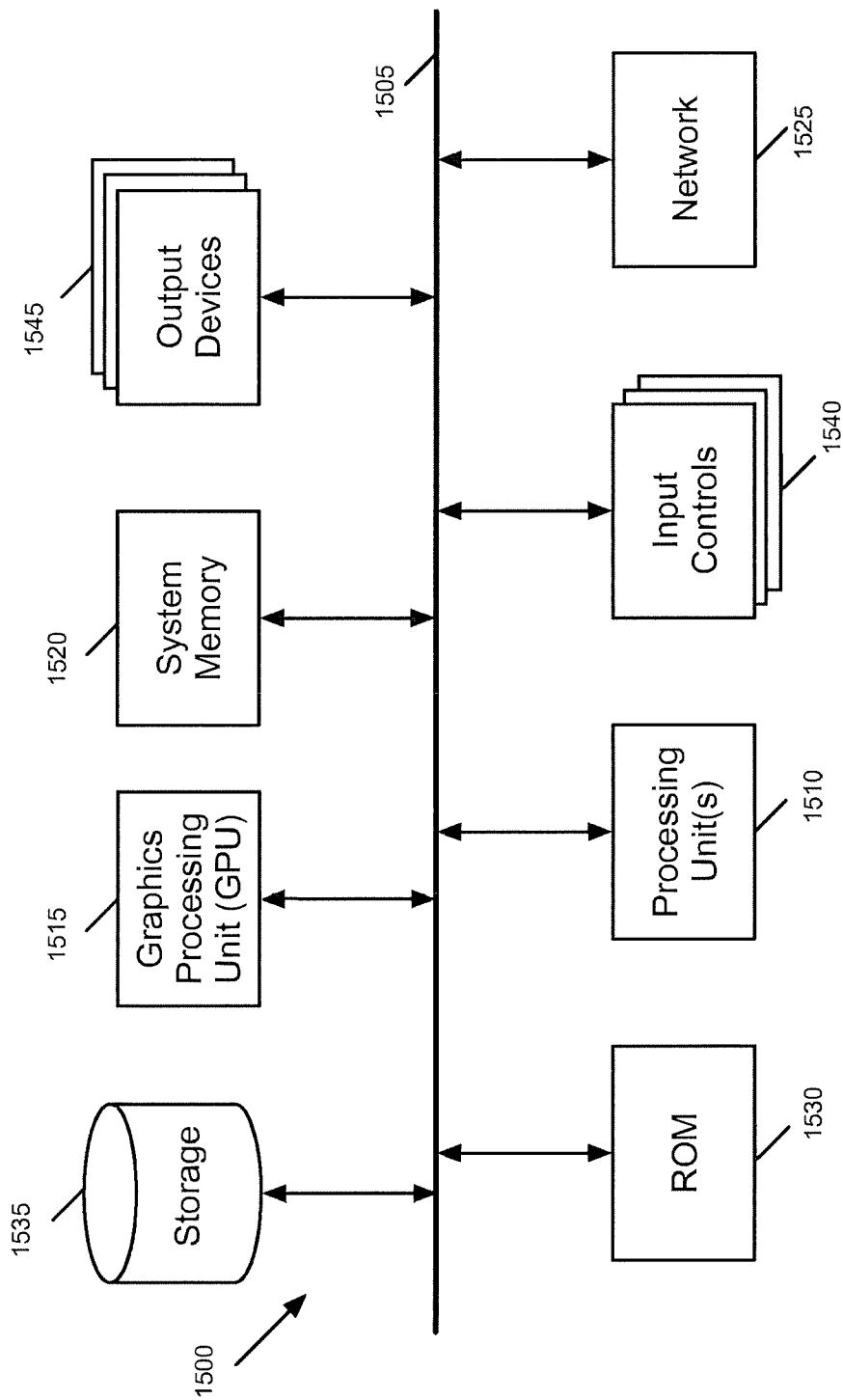
FIG. 15 conceptually illustrates an example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535. From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510. In some embodiments, such functionality can be provided using Coreimage's kernel shading language.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:
1. A method comprising:
from a particular application installed on a mobile device, retrieving a list of one or more web domains stored with the particular application;

for a particular web domain in the list of one or more web domains, retrieving a list of one or more applications allowed access to user interaction data for the particular web domain; and when the particular application is on the list of one or more applications retrieved from the particular web domain, storing a verified relationship between the particular application and the particular web domain.

2. The method of claim 1, wherein each web domain in the list of one or more web domains is paired with a type of user interaction data and each application in the list of one or more applications is paired with a type of user interaction data.

3. The method of claim 2, wherein the verified relationship is only stored between the particular application and the particular web domain when a particular type of user interaction data is paired with both the particular application and the particular web domain.

4. The method of claim 3, wherein the verified relationship is stored as a record in a database that indicates the particular application, particular web domain, and the particular type of user interaction data.

5. The method of claim 2, wherein at least one web domain is listed more than once in the list of one or more web domains and paired with several types of user interaction data.

6. The method of claim 1, further comprising:
receiving a request from the particular application to utilize user interaction data stored on the mobile device based on interaction with the particular web domain; and
based on the stored verified relationship, granting the particular application access to the requested user interaction data.

7. The method of claim 1, wherein the verified relationship is stored locally on the mobile device.

8. A device comprising:
a memory; and
at least one processor configured to:
from a particular application installed on the device, retrieve a list of one or more web domains stored with the particular application;
for a particular web domain in the list of one or more web domains, retrieve a list of one or more applications allowed access to user interaction data for the particular web domain; and
when the particular application is on the list of one or more applications retrieved from the particular web domain, store a verified relationship between the particular application and the particular web domain.

9. The device of claim 8, wherein each web domain in the list of one or more web domains is paired with a type of user interaction data and each application in the list of one or more applications is paired with a type of user interaction data.

10. The device of claim 9, wherein the verified relationship is only stored between the particular application and the particular web domain when a particular type of user interaction data is paired with both the particular application and the particular web domain.

11. The device of claim 10, wherein the verified relationship is stored as a record in a database that indicates the particular application, particular web domain, and the particular type of user interaction data.

12. The device of claim 9, wherein at least one web domain is listed more than once in the list of one or more web domains and paired with several types of user interaction data.

13. The device of claim 8, wherein the at least one processor is further configured to:
receive a request from the particular application to utilize user interaction data stored on the device based on interaction with the particular web domain; and
based on the stored verified relationship, grant the particular application access to the requested user interaction data.

14. The device of claim 8, wherein the verified relationship is stored locally on the device.

15. A non-transitory machine-readable medium comprising instructions that, when executed by one or more processors, cause the one or more processors to perform operations comprising:
from a particular application installed on a mobile device, retrieving a list of one or more web domains stored with the particular application;
for a particular web domain in the list of one or more web domains, retrieving a list of one or more applications allowed access to user interaction data for the particular web domain; and
when the particular application is on the list of one or more applications retrieved from the particular web domain, storing a verified relationship between the particular application and the particular web domain.

16. The non-transitory machine-readable medium of claim 15, wherein each web domain in the list of one or more web domains is paired with a type of user interaction data and each application in the list of one or more applications is paired with a type of user interaction data.

17. The non-transitory machine-readable medium of claim 16, wherein the verified relationship is only stored between the particular application and the particular web domain when a particular type of user interaction data is paired with both the particular application and the particular web domain.

18. The non-transitory machine-readable medium of claim 17, wherein the verified relationship is stored as a record in a database that indicates the particular application, particular web domain, and the particular type of user interaction data.

19. The non-transitory machine-readable medium of claim 16, wherein at least one web domain is listed more than once in the list of one or more web domains and paired with several types of user interaction data.

20. The non-transitory machine-readable medium of claim 15, wherein the operations further comprise:
receiving a request from the particular application to utilize user interaction data stored on the mobile device based on interaction with the particular web domain; and
based on the stored verified relationship, granting the particular application access to the requested user interaction data.

* * * * *